(12) United States Patent
Geissler

(10) Patent No.: US 10,239,131 B2
(45) Date of Patent: Mar. 26, 2019

(54) MACHINE TOOL, IN PARTICULAR MULTI-SPINDLE MILLING MACHINE

(71) Applicant: DECKEL MAHO Pfronten GmbH, Pfronten (DE)

(72) Inventor: Alfred Geissler, Pfronten (DE)

(73) Assignee: DECKEL MAHO Pfronten GmbH, Pfronten (DE)

(*) Notice: Subject to any disclaimer, the term of this patent is extended or adjusted under 35 U.S.C. 154(b) by 218 days.

(21) Appl. No.: 15/273,129

(22) Filed: Sep. 22, 2016

(65) Prior Publication Data

US 2017/0080502 A1 Mar. 23, 2017

(30) Foreign Application Priority Data

Sep. 22, 2015 (DE) .................. 10 2015 218 206

(51) Int. Cl.
*B23Q 3/157* (2006.01)
*B23C 1/04* (2006.01)
(Continued)

(52) U.S. Cl.
CPC ............... *B23C 1/04* (2013.01); *B23C 1/002* (2013.01); *B23Q 1/012* (2013.01); *B23Q 1/015* (2013.01);
(Continued)

(58) Field of Classification Search
CPC ........ B23Q 2039/002; B23Q 2039/004; B23Q 2039/006; B23Q 39/021; B23Q 39/022; B23Q 39/024; B23Q 7/047; B23Q 3/15722; B23Q 3/15733; B23Q 3/15713; Y10T 408/37; B23C 1/04

USPC ............................................. 409/203
See application file for complete search history.

(56) References Cited

U.S. PATENT DOCUMENTS 2,682,698 A 7/1954 Berthiez
3,846,904 A 11/1974 Kuhnert
(Continued)

FOREIGN PATENT DOCUMENTS

DE 2 102 860 A1 12/1972
DE 34 04 838 A1 8/1984
(Continued)

OTHER PUBLICATIONS

International Search Report for EP Application No. 16190178.0 dated Feb. 20, 2017, w/partial English Translation.

*Primary Examiner* — Daniel Howell
(74) *Attorney, Agent, or Firm* — Seed Intellectual Property Law Group LLP

(57) ABSTRACT

The present invention relates to embodiments of a machine tool, in particular a multi-spindle milling machine, comprise a machine frame, a workpiece clamping device for clamping a workpiece, an axis slide assembly arranged on the machine frame, and a spindle carrier assembly which is arranged on the machine frame and has at least two tool-carrying work spindles. The axis slide assembly is configured to linearly move the workpiece clamped at the workpiece clamping device by way of three controllable linear axes X, Y and Z. The work spindles are arranged at a turret which can be rotated or swiveled about a turret axis at respectively equal distance from the turret axis, and the spindle axes of the work spindles are aligned or can be aligned in parallel to one another and in parallel to the turret axis.

24 Claims, 19 Drawing Sheets

A-A

(51) Int. Cl.
  *B23C 1/00* (2006.01)
  *B23Q 3/06* (2006.01)
  *B23Q 7/00* (2006.01)
  *B23Q 11/08* (2006.01)
  *B23Q 39/00* (2006.01)
  *B23Q 1/01* (2006.01)
  *B23Q 39/02* (2006.01)
  *B23Q 7/04* (2006.01)

(52) U.S. Cl.
  CPC ........... *B23Q 3/06* (2013.01); *B23Q 3/15713* (2013.01); *B23Q 3/15722* (2016.11); *B23Q 3/15733* (2013.01); *B23Q 7/00* (2013.01); *B23Q 7/047* (2013.01); *B23Q 11/0883* (2013.01); *B23Q 39/00* (2013.01); *B23Q 39/024* (2013.01); *B23C 2270/08* (2013.01); *B23Q 2039/002* (2013.01); *B23Q 2039/004* (2013.01); *B23Q 2039/006* (2013.01); *B23Q 2220/002* (2013.01); *Y10T 408/37* (2015.01)

(56) References Cited

U.S. PATENT DOCUMENTS

| | | |
|---|---|---|
| 4,602,901 A | 7/1986 | Cotta Ramusino |
| 5,439,431 A | 8/1995 | Hessbrüggen et al. |
| 5,486,151 A * | 1/1996 | Bergmann ........... B23Q 3/1574 483/1 |
| 5,664,308 A * | 9/1997 | Deitert ................... B23Q 39/02 29/40 |
| 5,781,983 A * | 7/1998 | Gruner ................... B23Q 7/047 29/33 P |
| 8,506,215 B2 * | 8/2013 | Liang ..................... B24B 5/185 409/138 |
| 2003/0050160 A1* | 3/2003 | Popp ...................... B23Q 1/015 483/14 |
| 2015/0117973 A1* | 4/2015 | Haas ....................... B23Q 1/26 408/53 |
| 2016/0346888 A1* | 12/2016 | Huber ................. A61C 13/0022 |
| 2017/0209972 A1* | 7/2017 | Geissler .................. B23Q 5/046 |
| 2017/0209975 A1* | 7/2017 | Geissler ............... B23Q 39/042 |
| 2018/0043487 A1* | 2/2018 | Demmeler ............. B23Q 3/157 |

FOREIGN PATENT DOCUMENTS

| | | | |
|---|---|---|---|
| DE | 102006002863 A1 * | 7/2007 | .......... B23Q 1/4828 |
| DE | 10 2010 064 271 A1 | 6/2012 | |
| DE | 102013003769 A1 * | 8/2014 | ............. B23F 19/10 |
| DE | 10 2015 000 503 A1 | 9/2015 | |
| WO | WO 2005102596 A2 * | 11/2005 | ............. B23Q 1/015 |
| WO | WO 2008089751 A1 * | 7/2008 | .......... B23Q 11/128 |
| WO | 2015/008124 A1 | 1/2015 | |

\* cited by examiner

Fig. 19A  Fig. 19B  Fig. 19C
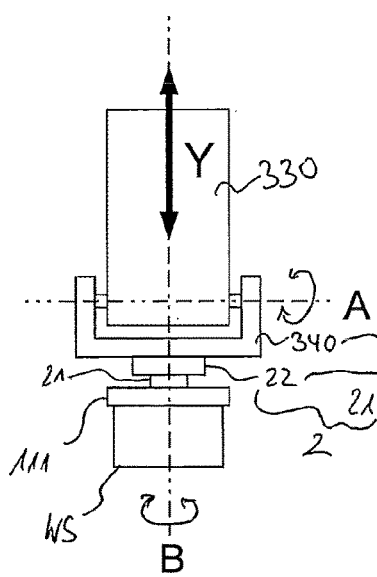
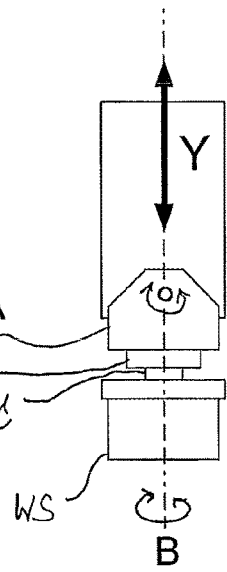
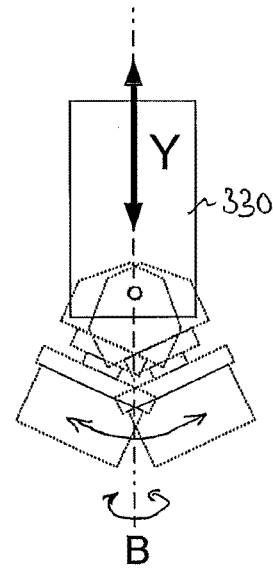
Fig. 20A  Fig. 20B
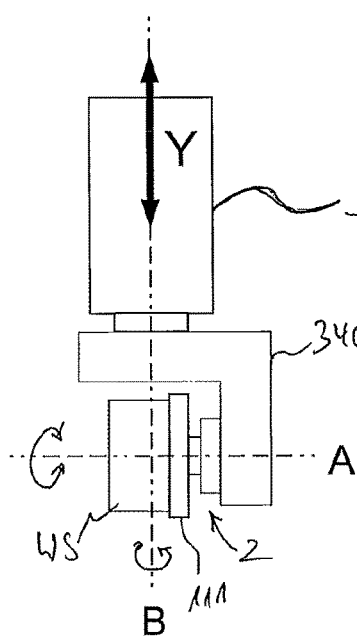
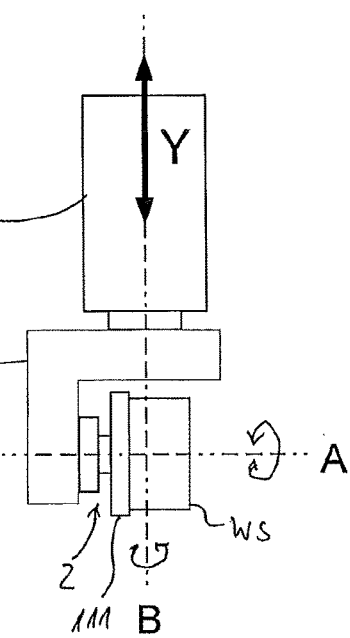

MACHINE TOOL, IN PARTICULAR MULTI-SPINDLE MILLING MACHINE

BACKGROUND

Technical Field

The present disclosure relates to a machine tool, in particular a numerically controllable machine tool or milling machine. In particular, the present disclosure relates to a multi-spindle milling machine, multi-spindle drilling machine and multi-spindle milling/drilling machine, or a multi-spindle universal milling machine and a multi-spindle machining center.

Description of the Related Art

The prior art discloses machine tools having a tool-carrying work spindle. Nowadays, these machine tools are equipped in most cases with numerical controls and are known, e.g., as milling machines, milling centers, universal milling machines or CNC machining centers having four, five or sometimes also more than five numerically controllable linear axes and/or rotary axes or swivel axes, see, e.g., the machining tool according to DE 10 2010 064 271 A1.

Such machine tools having a tool-carrying work spindle have to be distinguished from machine tools having a workpiece-carrying work spindle, such as lathes, turning centers, double spindle lathes, multi-spindle lathes or multi-spindle automatic lathes.

It is always a fundamental object in the field of the machine tool manufacture and also in particular an underlying object of the present disclosure to provide a machine tool having a tool-carrying work spindle, in particular a machine tool for the milling and/or drilling or boring machining of a workpiece, which simultaneously operates with precision and reliably with the least possible down times and can also be produced in a cost-effective, compact and efficient way.

BRIEF SUMMARY

The present disclosure proposes a machine tool, in particular according to claim 1 and/or the alternative independent claims. The dependent claims relate to preferred embodiments of the disclosure.

According to a first aspect, a machine tool is proposed which has a machine frame, an axis slide assembly that is arranged on the machine frame and is configured to linearly move the workpiece clamped at the workpiece clamping device by way of one, two or three controllable linear axes, and a spindle carrier assembly which is arranged on the machine frame and has at least two tool-carrying work spindles.

The work spindles are preferably arranged on a turret which can be rotated or swiveled about a turret axis at respectively equal distance from the turret axis, and are disposed at a respectively equal distance from the turret axis, and the spindle axes of the work spindles are preferably disposed in parallel to one another and are preferably aligned or can preferably be aligned in parallel to the turret axis.

Alternatively, the work spindles are preferably arranged on the turret which can be rotated or swiveled about the turret axis at respectively equal distance from the turret axis and can also preferably be moved in one direction by way of a respective linear axis parallel to the spindle axis and/or parallel to the turret axis, and the spindle axes of the work spindles are preferably aligned or can preferably be aligned in parallel to one another and in parallel to the turret axis.

Here, the disclosure is based on the idea of a completely new and extraordinary machine tool basic concept for a machine tool having tool-carrying work spindles (in contrast to machine tools having workpiece-carrying work spindles such as lathes or multi-spindle lathes) to provide a multi-spindle machine tool having two (double spindle machine tool) or more (triple spindle machine tool or multiple machine tool) tool-carrying work spindles which are arranged on a rotatable turret that can be made, e.g., as one or several rotary disks or also as a spindle-carrying support drum.

This makes it possible in an advantageous, extraordinary and novel way to create a precisely operating, cost-effective, extremely compact and efficient machine tool with optimally minimized down times since in each case at least one (or more) of the spindles can machine a workpiece in a respective work position while a tool change can be carried out at least at one other spindle (or at several other spindles) in a respective tool change position without interrupting the machining of the workpiece or the workpieces due to the tool change, the only interruptions of the actual machining of the workpiece or the workpieces resulting from the extremely fast turret rotations (in particular about one to two seconds or even less than a second) of the turret.

According to an exemplary preferred aspect, the machine frame can form a machining area, the axis slide assembly being preferably arranged above the machining area on the machine frame.

The workpiece clamping device is preferably held on the axis slide assembly. The tool clamping device is preferably configured to clamp the workpiece or a workpiece pallet holding the workpiece in suspended or laterally suspended fashion, more preferably for the overhead machining of the workpiece clamped at the workpiece clamping device in a suspended fashion.

An advantage of the overhead machining is that an optimum chip fall can be achieved without soiling the workpiece or the axis slide structure in the machining area. As a result, the chip conveying device can also have a simpler design and in some embodiments it is advantageously possible to even only use an external chip conveyor without a machine integrated conveying mechanism.

The workpiece clamping device preferably comprises a suspended rotary table having a vertical axis of rotation and/or a gripping device which can be rotated about a vertical axis of rotation in order to grip in suspended fashion the workpiece and/or the workpiece pallet. The rotary table and/or the gripping device of the workpiece clamping device can preferably be rotated or swiveled about a horizontal rotary axis or swivel axis.

In exemplary embodiments (optionally alternative to the above described exemplary embodiment), the workpiece clamping device preferably comprises a rotary table having a rotary axis or swivel axis and/or a gripping device which can be rotated about a horizontal axis of rotation in order to grip the workpiece and/or the workpiece pallet in a laterally suspended fashion. The rotary table and/or the gripping device of the workpiece clamping device can preferably be rotated or swiveled about a vertical rotary axis or swivel axis.

According to an exemplary preferred aspect, the machine tool can comprise a conveying device for conveying workpieces. In particular, such a conveying device might preferably be configured to convey workpieces having an upwardly or laterally aligned workpiece pallet.

Such a conveying device is preferably configured to convey workpieces to a clamping position in a machining area of the machine tool in order to be accommodated by the workpiece clamping device from above for the suspended or laterally suspended clamping of one of the workpieces at the workpiece clamping device and/or configured to convey one of the workpieces, in particular with an upwardly or laterally aligned workpiece pallet, from an unclamping position from the machining area of the machine tool after releasing the workpiece from the suspended or laterally suspended clamping by the workpiece clamping device.

According to an exemplary preferred aspect, the axis slide assembly is preferably also configured to rotate the workpiece clamped at the workpiece clamping device by way of a controllable first rotary axis or swivel axis about a first axis of rotation. The first axis of rotation of the first rotary axis or swivel axis is preferably aligned vertically.

Furthermore, the axis slide assembly is preferably configured additionally or alternatively to rotate the workpiece clamped at the workpiece clamping device by way of a controllable second rotary axis or swivel axis about a second axis of rotation aligned transversely or perpendicularly to the first axis of rotation. The second axis of rotation of the second rotary axis or swivel axis is preferably aligned horizontally.

The turret axis of the rotatable turret is preferable aligned horizontally, and the horizontally aligned second axis of rotation of the second rotary axis or swivel axis is preferably aligned in parallel or perpendicularly to the turret axis of the rotatable turret.

According to an exemplary preferred aspect, a first tool-carrying work spindle and a second work spindle of the at least two tool-carrying work spindles are arranged in relation to the turret axis oppositely to the rotatable turret, the turret axis being preferably aligned in particular horizontally.

The first work spindle is preferably positioned at a machining position of the machine tool when the second work spindle is positioned at a tool change position of the machine tool and/or the second work spindle is preferably positioned at the machining position of the machine tool when the first work spindle is positioned at the tool change position of the machine tool.

The spindle carrier assembly is preferably configured to change the positioning of the first work spindle, in particular preferably at the working or tool change position, by swiveling the rotatable turret about the turret axis by 180° with the positioning of the second work spindle, in particular preferably at the tool change position or machining position.

According to an exemplary preferred aspect, a number N of tool-carrying work spindles with N≥2 or N>2 are arranged at a respective angular distance of an angle $\alpha=360°/N$ at the rotatable turret, the turret axis being preferably aligned in particular in a horizontal fashion. A first work spindle of the N work spindles is preferably positioned at a machining position of the machine tool when a second work spindle of the N work spindles is positioned at a tool change position of the machine tool.

The spindle carrier assembly is preferably configured to swivel the first work spindle by rotating the rotatable turret about the turret axis by the angle $\alpha=360°/N$ to the tool change position and/or to swivel the second work spindle by rotating the rotatable turret about the turret axis by the angle $\alpha=360°/N$ in the opposite direction to the machining position.

In all of the above mentioned embodiments, it is preferred for the work spindle positioned at the machining position to be configured by way of an accommodated tool to machine the workpiece clamped at the workpiece clamping device (2).

According to an exemplary preferred aspect, the machine tool comprises a tool magazine which is configured to have available a plurality of tools and/or a tool change device which is configured to exchange tools and is in particular configured to insert a tool to be inserted at the work spindle positioned at the tool change position, to remove a tool accommodated at the work spindle positioned at the tool change position and/or to exchange a tool accommodated at the work spindle positioned at the tool change position with a tool removed from the tool magazine.

The work spindle/s positioned at the respective machining position/s is/are configured by way of a respectively accommodated tool to machine the workpiece/s clamped at the workpiece clamping device (2) while the tool change apparatus inserts or removes a respective tool at the work spindle/s positioned at the tool change position/s or exchanges it with a tool removed from the tool magazine.

According to an exemplary preferred aspect, the machine tool comprises a protection cover apparatus which can be opened and closed automatically and which in the closed state preferably separates a machining area of the machine tool that includes the workpiece clamping device from a tool change area of the machine tool that includes the tool change apparatus.

The protection cover apparatus preferably opens when one of the work spindles is swiveled from the tool change position or from a rest position or into the machining position and/or one of the other work spindles is swiveled from the machining position or from a rest position or into the tool change position by rotating the turret, and/or preferably closes after the rotation of the turret.

According to an exemplary preferred aspect, the work spindles arranged on the rotatable turret can be attached, mounted or held in fixed fashion with spindle axes aligned in parallel to the turret axis.

According to a further exemplary preferred aspect, one or more of the work spindles arranged on the rotatable turret can be attached, mounted or held in swiveled fashion. The one or more work spindles that can be swiveled can preferably be aligned in parallel to the turret axis and/or are configured to be swiveled, e.g., to be swiveled in particular at the work position at a vertical plane and/or at a horizontal plane in relation to the alignment of the turret axis.

According to a further exemplary preferred aspect, one or more of the work spindles arranged on the rotatable turret can be moved in a direction by way of a linear axis parallel to the spindle axis and/or parallel to the turret axis.

In summary, a tool machine concept is proposed which makes it possible in advantageous fashion to create in an advantageous, extraordinary and novel way a precisely operating, cost-effective, extremely compact and efficient machine tool having optimally minimized down times, in particular since in each case at least one (or more) of the spindles can machine a workpiece at a respective work position while at least at one other spindle (or at several other spindles) a tool can be exchanged at a respective tool change position without interrupting the machining of the workpiece or the workpieces due to the tool change, the only interruptions of the actual machining of the workpiece or the workpieces being the extremely fast (in particular about one to two seconds or even less than one second) turret rotations of the turret.

Further aspects and advantages thereof as well as also advantages and more special embodiment possibilities of the above described aspects and features are described in the below descriptions and explanations of the appending drawings and should not at all be considered to have a limiting effect.

BRIEF DESCRIPTION OF THE SEVERAL VIEWS OF THE DRAWINGS

FIG. 19A shows an exemplary front view of a tool carrier axis slide of a machine tool according to a further embodiment of the disclosure, and FIGS. 19B and 19C show exemplary side views of the tool carrier axis slide from FIG. 19A; and FIGS. 20A and 20B show exemplary front views of a tool carrier axis slide of a machine tool according to a further embodiment of the disclosure.

DETAILED DESCRIPTION

Figure 1:
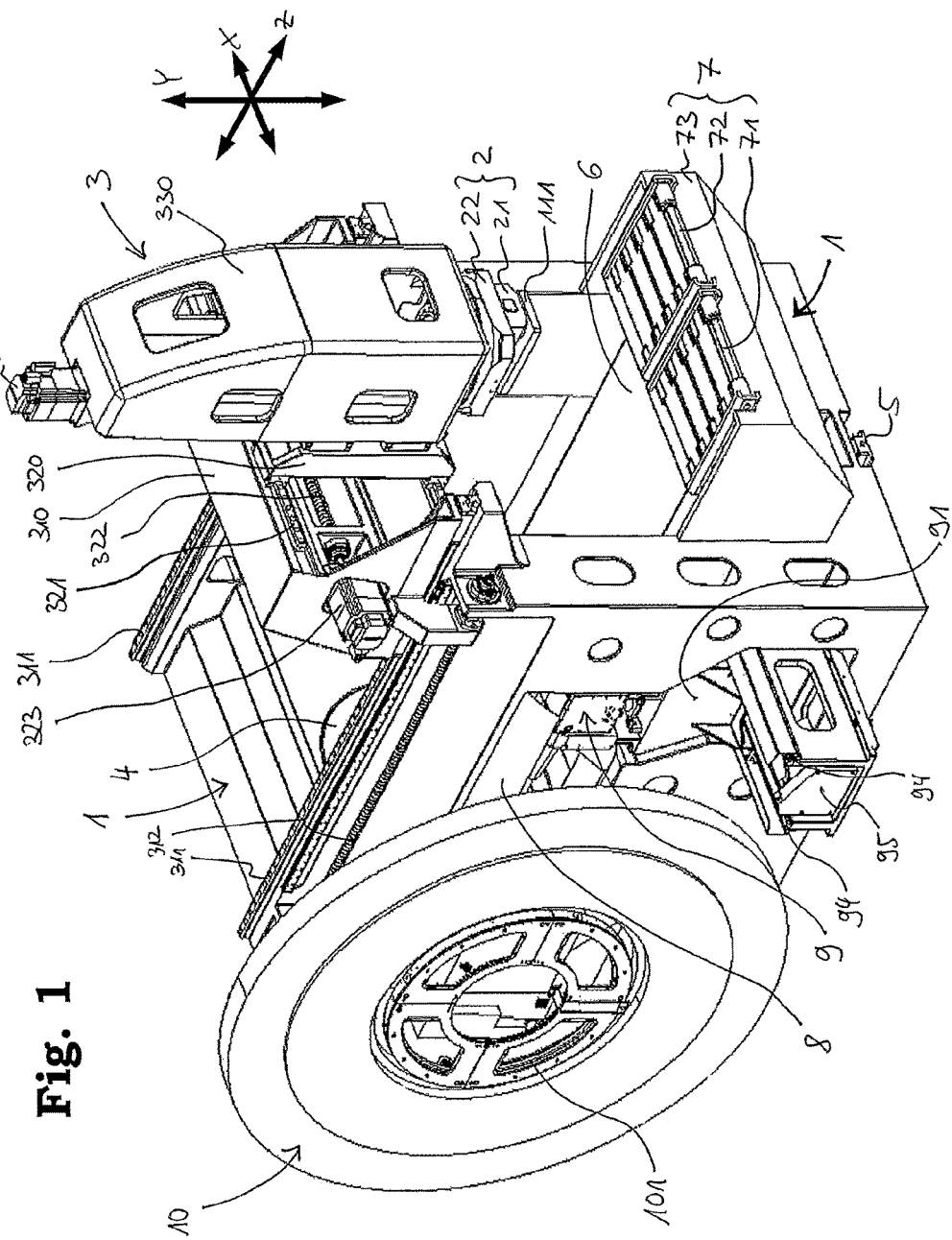
FIG. 1 shows an exemplary perspective view of a machine tool according to an embodiment of the disclosure.

Examples and embodiments of the present disclosure are specified below with reference to the enclosed drawings. Equal and similar elements in the drawings can here be provided with the same reference signs, and sometimes also with different reference signs.

However, it is pointed out that the present disclosure is by no means limited or restricted to the below described embodiments and the embodiment features thereof but comprises further modifications of the embodiments, in particular those that are comprised by modifications of the features of the described examples or by a combination of individual or a plurality of features of the described examples on the basis of the scope of protection of the independent claims.

FIGS. 1 to 11 relate to a first embodiment of the present disclosure and show exemplary views of a machine tool. The 4-axis (double spindle) milling machine shown is only an example. It has three controllable linear axes and a controllable rotary axis (as an example a vertical B-axis) where, by way of example, all four controllable axes can move the workpiece and the machining position of the machining work spindle remains, e.g., stationary when the workpiece is machined.

As an example, the machine tool according to FIGS. 1 to 11 is made in particular as a numerically controllable 4-axis milling machine having four drivable axes X (e.g., X-axis 32), Y (e.g., Y-axis 33), Z (e.g., Z-axis 31) and B (e.g., B-axis), in particular having three linear axes X, Y and Z which are aligned, e.g., orthogonally to one another and a rotary axis B (B-axis) having an axis of rotation aligned in parallel, e.g., to the Y-axis.

In further embodiments, it is possible to omit one or more of the provided axes and/or to provide one or more linear axes and/or swivel axes or rotary axes, e.g., also one or more linear axes and/or swivel axes or rotary axes to move the tool.

It is mentioned herein that the difference between a rotary axis and a swivel axis is that a rotary axis can be controlled in rotatory fashion in both directions about its axis of rotation, optionally a rotation by 360 degrees or more or optionally by 720 degrees or more being possible, and that a swivel axis can be controlled in rotatory fashion in both directions about its axis of rotation between a first angular position and a second angular position, the angular positions being defined, optionally at an angular distance of 360 degrees or less, e.g., as 90 degrees, 120 degrees, 180 degrees, 270 degrees or 360 degrees.

Furthermore, the machine tool can comprise a numerical machine control unit (e.g., NC or CNC control optionally with one or more NC and PLC control units) and/or a machine control panel (not shown) and optionally have a machine tool housing (not shown).

Figure 2:
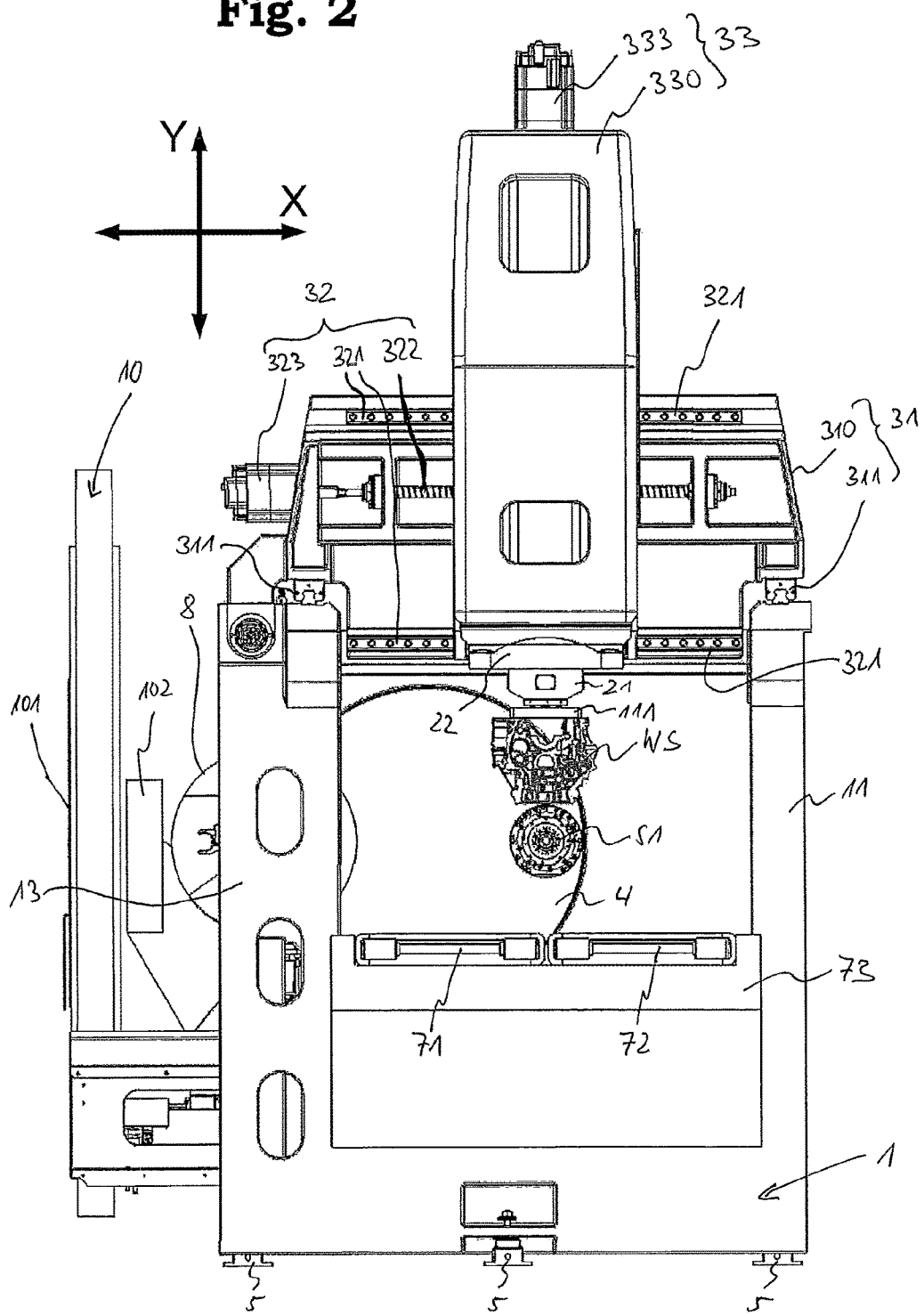
FIG. 2 shows an exemplary front view of the machine tool from FIG. 1.
Figure 3:
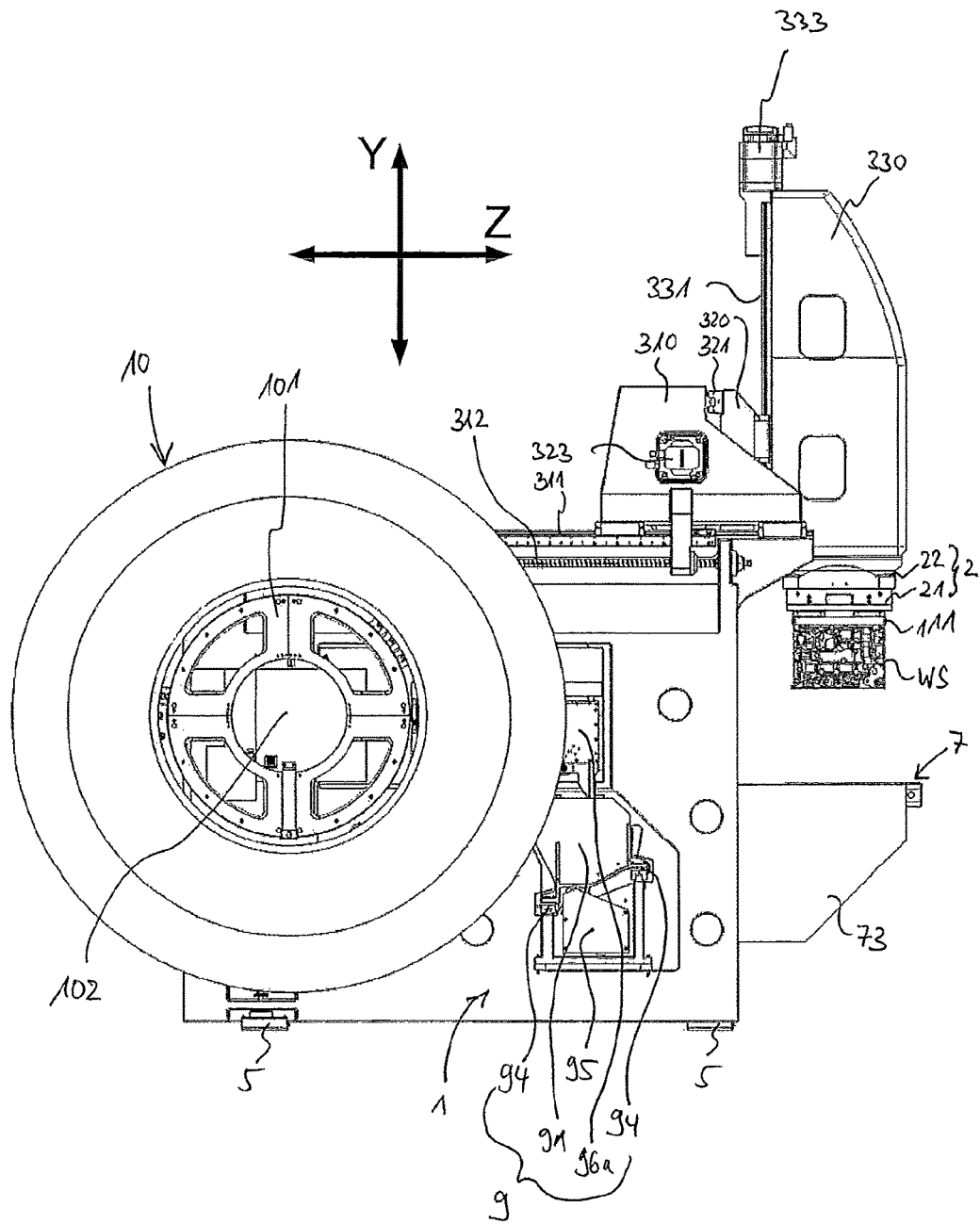
FIG. 3 shows an exemplary side view of the machine tool from FIG. 1.
Figure 4:
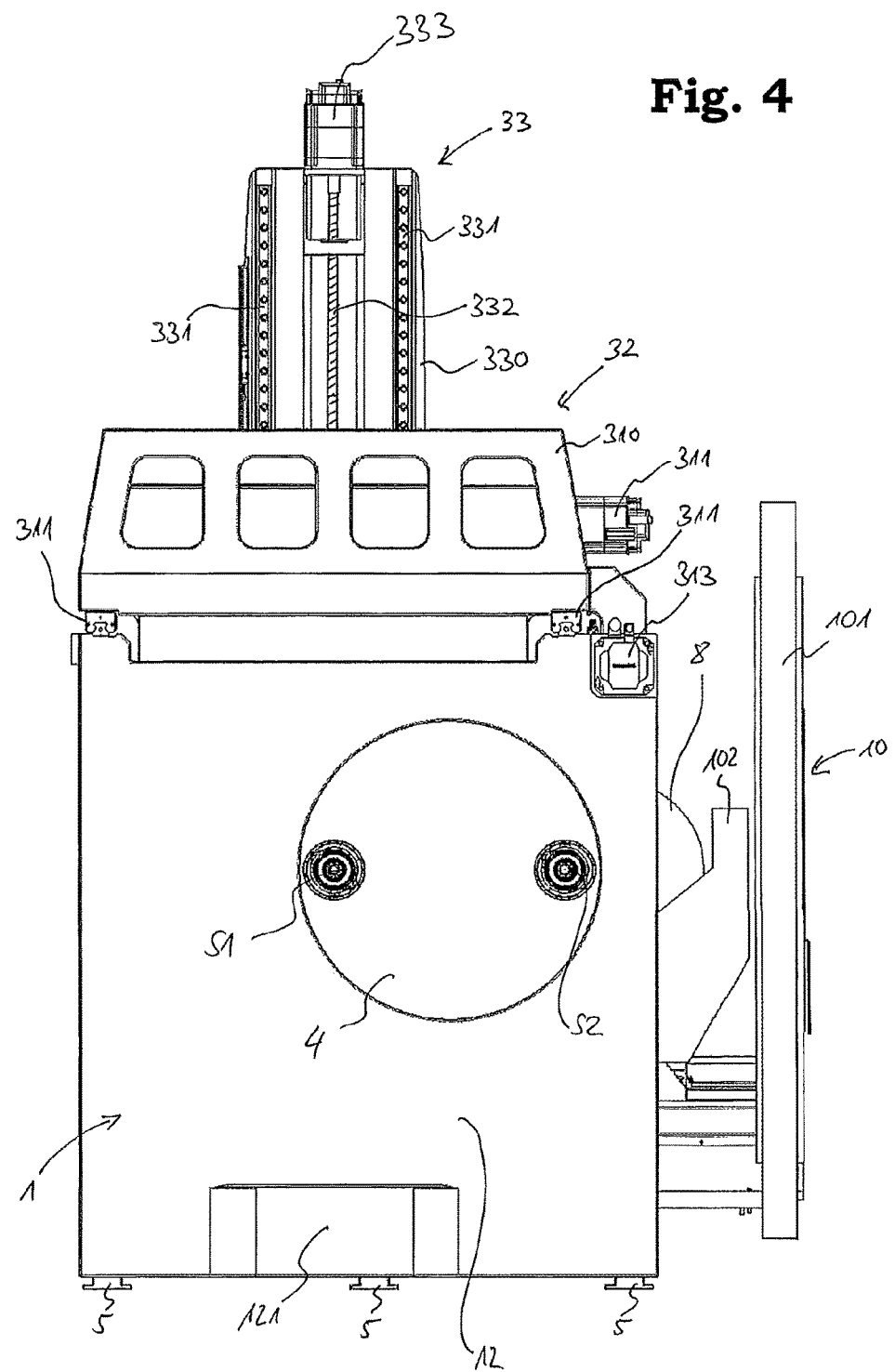
FIG. 4 shows an exemplary rear view of the machine tool from FIG. 1.
Figure 5:
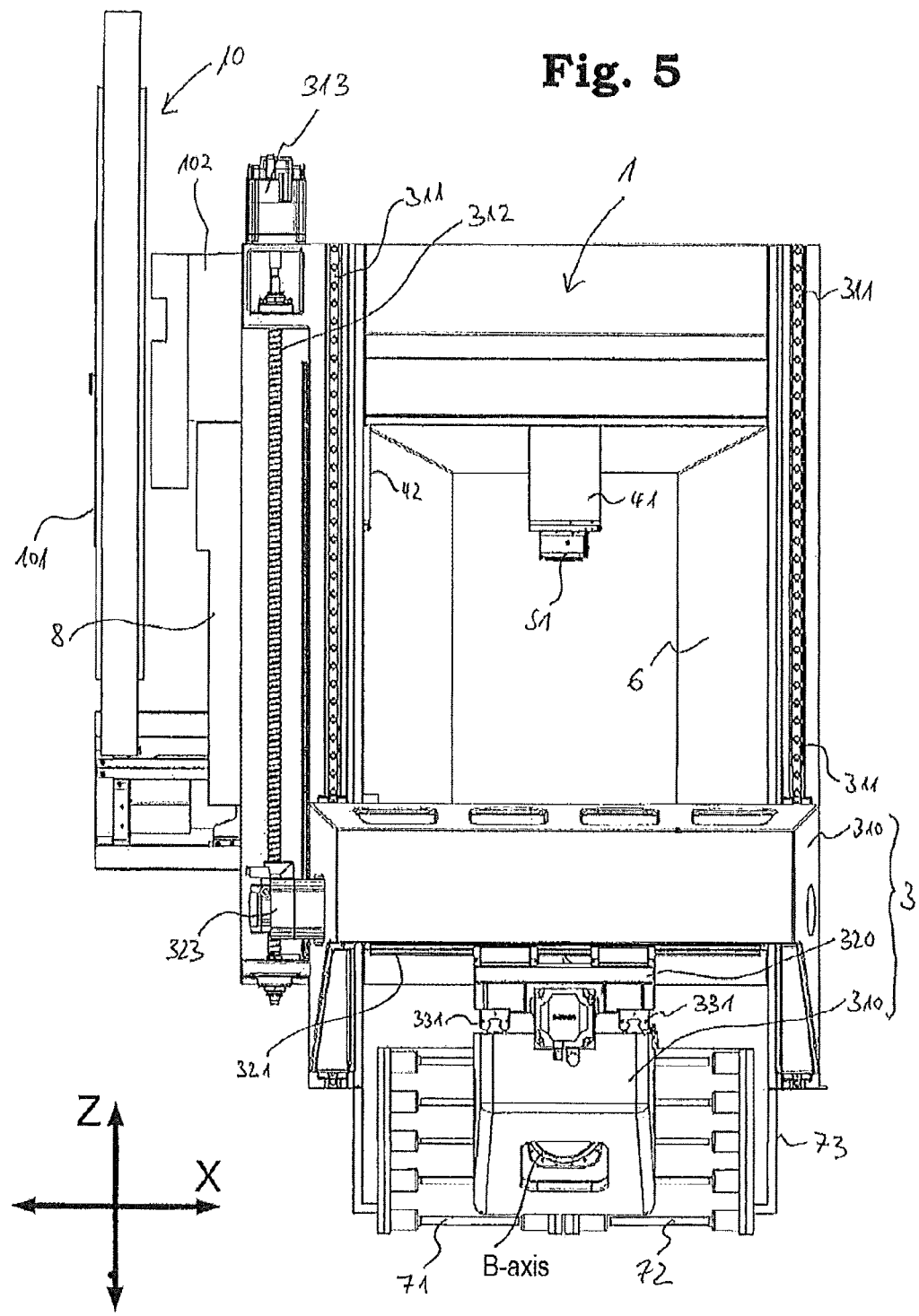
FIG. 5 shows an exemplary top view of the machine tool from FIG. 1.
Figure 6:
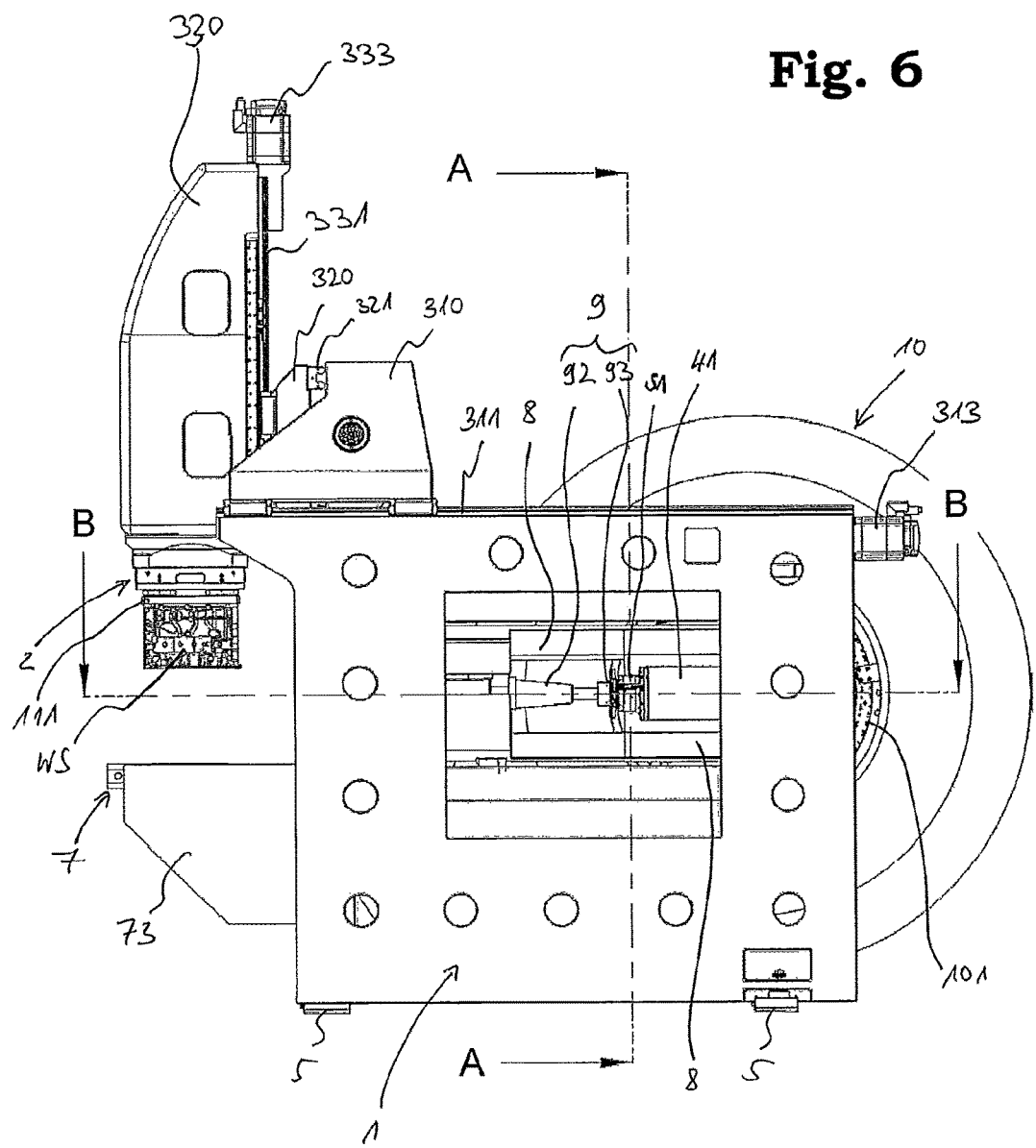
FIG. 6 shows an exemplary side view of the machine tool from FIG. 1 from an opposite direction in relation to FIG. 3.
Figure 7:
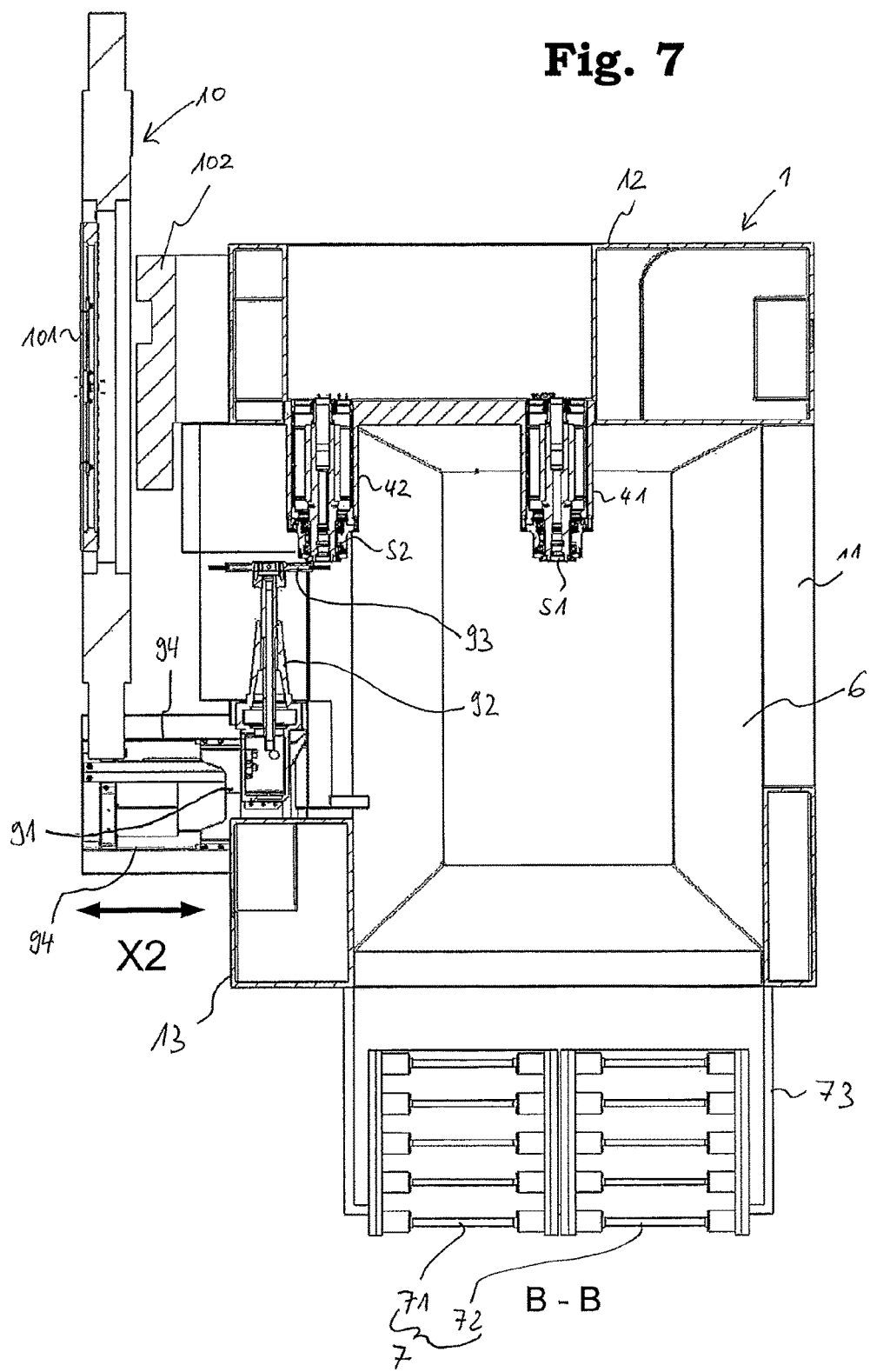
FIG. 7 shows an exemplary sectional view from above according to the horizontal sectional plane B-B in FIG. 6.
Figure 8:
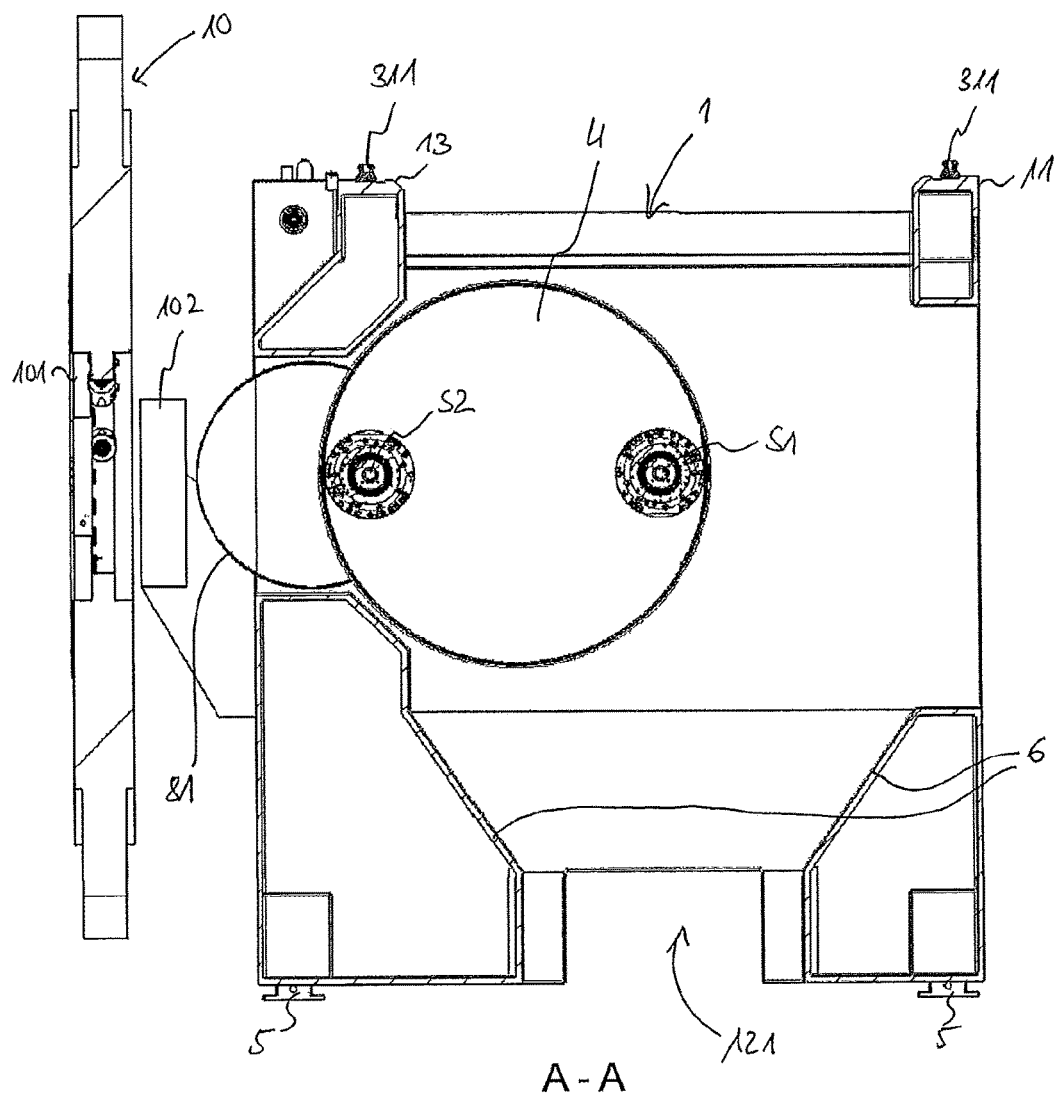
FIG. 8 shows an exemplary sectional view from the front according to the vertical sectional plane A-A in FIG. 6.
Figure 9:
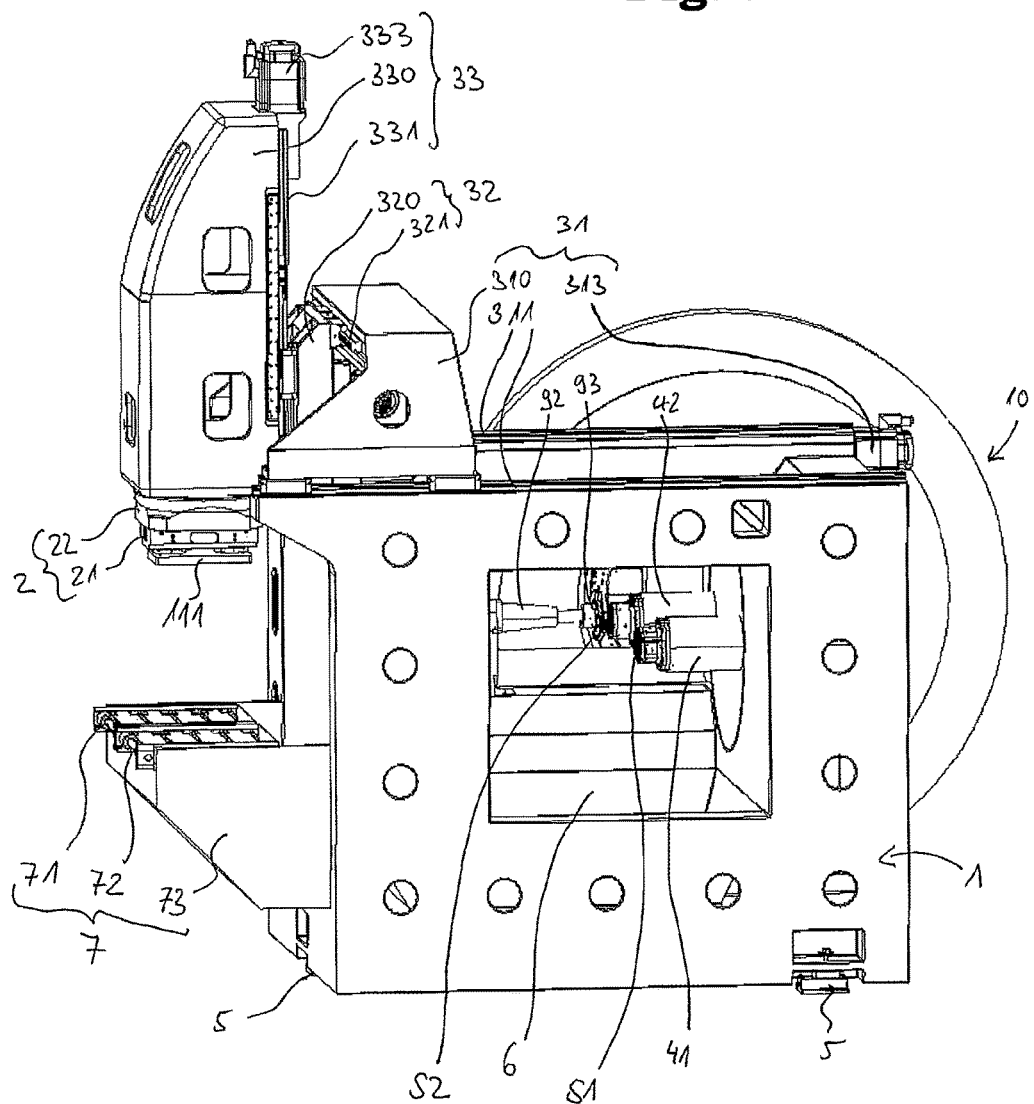
FIG. 9 shows a further exemplary perspective view of the machine tool from FIG. 1.
Figure 10:
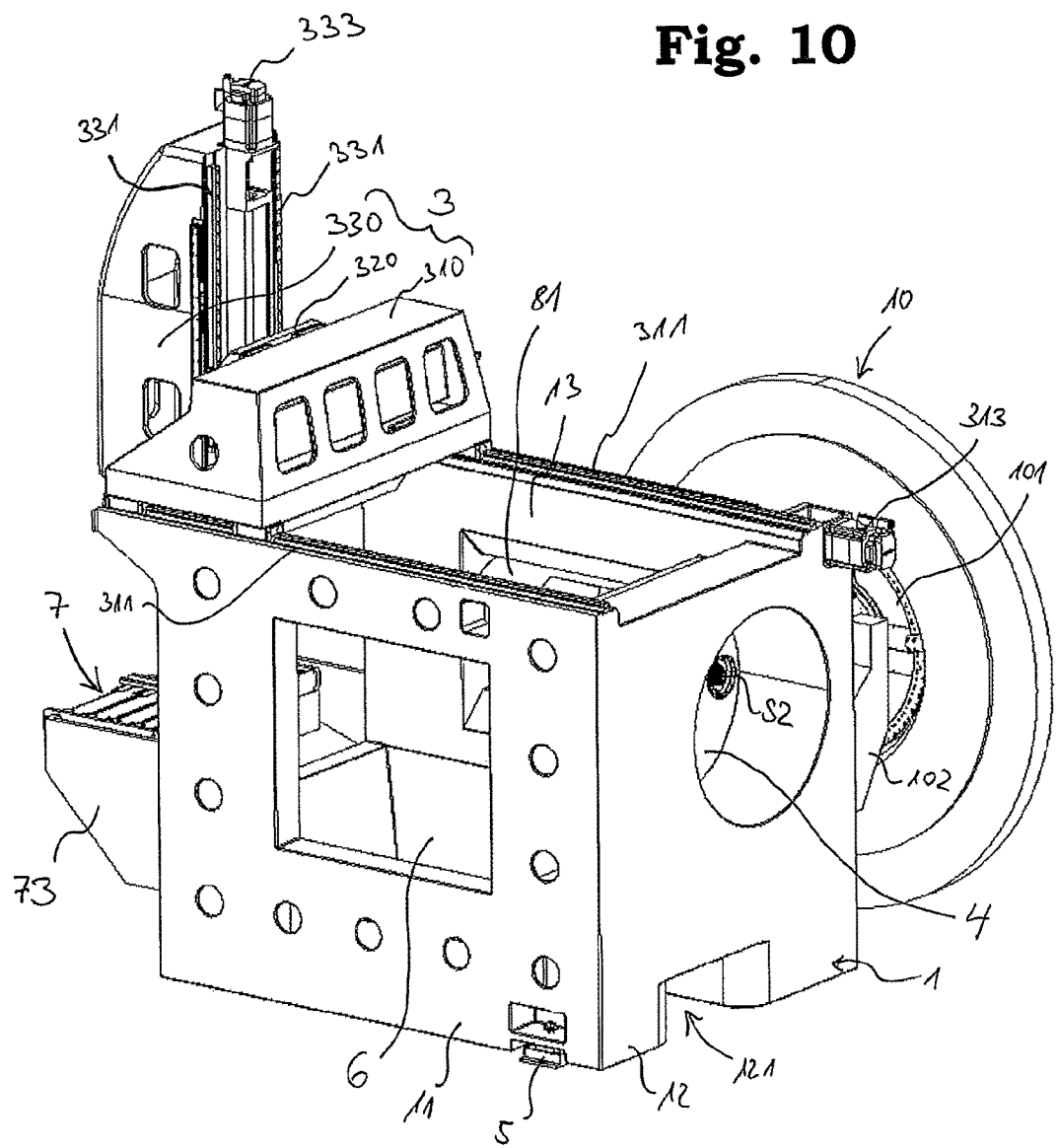
FIG. 10 shows a further exemplary perspective view of the machine tool from FIG. 1.
Figure 11:
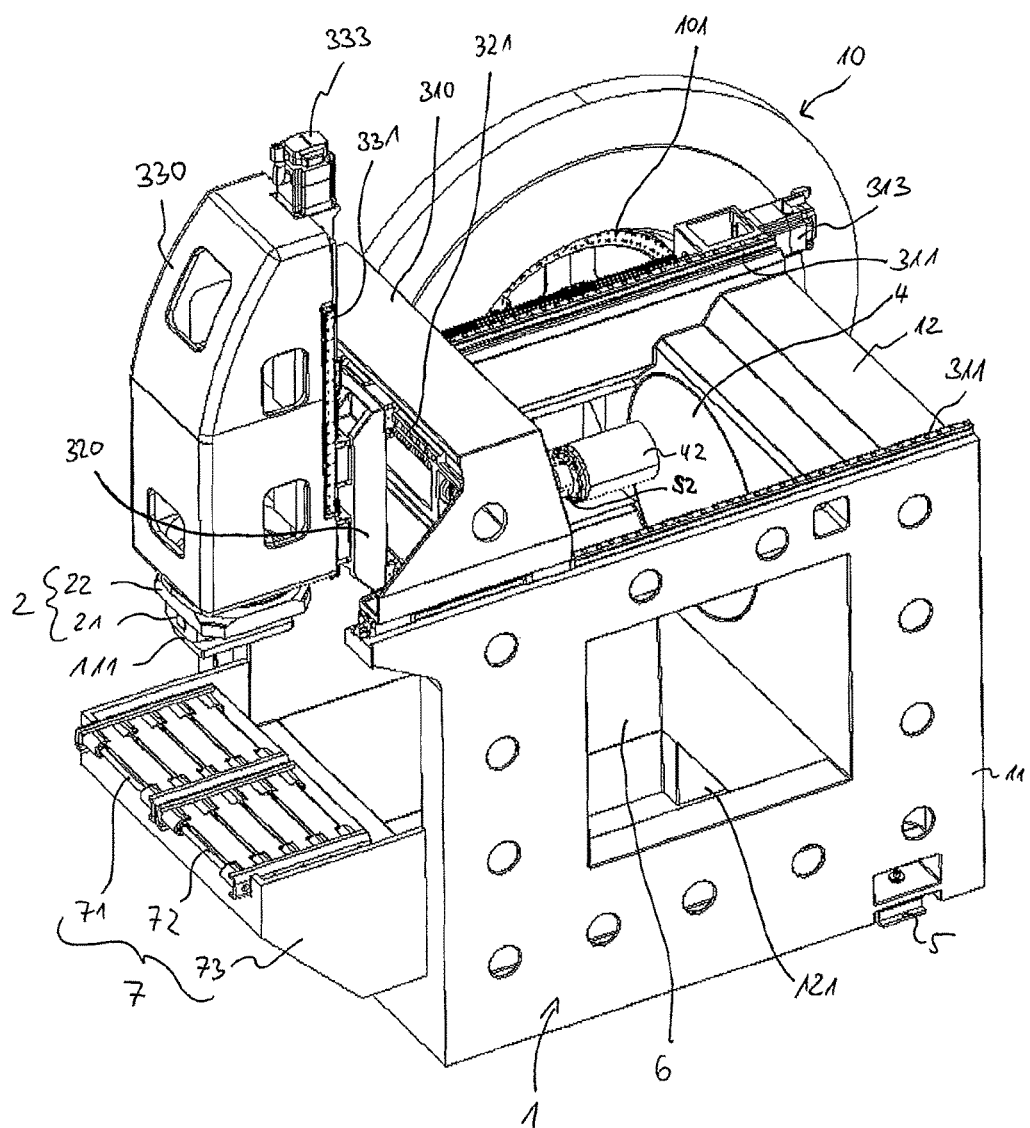
FIG. 11 shows a further exemplary perspective view of the machine tool from FIG. 1.

Regarding the embodiment according to FIGS. 1 to 11: FIG. 1 shows an exemplary perspective view of the machine tool (inclined view from the left front top), FIG. 2 shows an exemplary front view of the machine tool from FIG. 1, FIG. 3 shows an exemplary side view of the machine tool (from the left-hand side), FIG. 4 shows an exemplary rear view of the machine tool from FIG. 1, FIG. 5 shows an exemplary top view of the machine tool from FIG. 1, FIG. 6 shows an exemplary side view of the machine tool from FIG. 1 from an opposite direction in relation to FIG. 3 (from the right-hand side), FIG. 7 shows an exemplary sectional view from above according to the horizontal sectional plane B-B in FIG. 6, FIG. 8 shows an exemplary sectional view from the front according to the vertical sectional plane A-A in FIG. 6, FIG. 9 shows a further exemplary perspective view of the machine tool from FIG. 1 (inclined view from the right front top), FIG. 10 shows a further exemplary perspective view of the machine tool from FIG. 1 (inclined view from the right rear top) and FIG. 11 shows a further exemplary perspective view of the machine tool from FIG. 1 (inclined view from the right front top).

The machine tool according to FIG. 1 comprises a machine frame 1 that can be placed on pedestal elements 5. The exemplary structure of the machine frame 1 is shown in FIGS. 1 to 11 and can still be identified well in FIGS. 12A to 13.

Figure 12A:
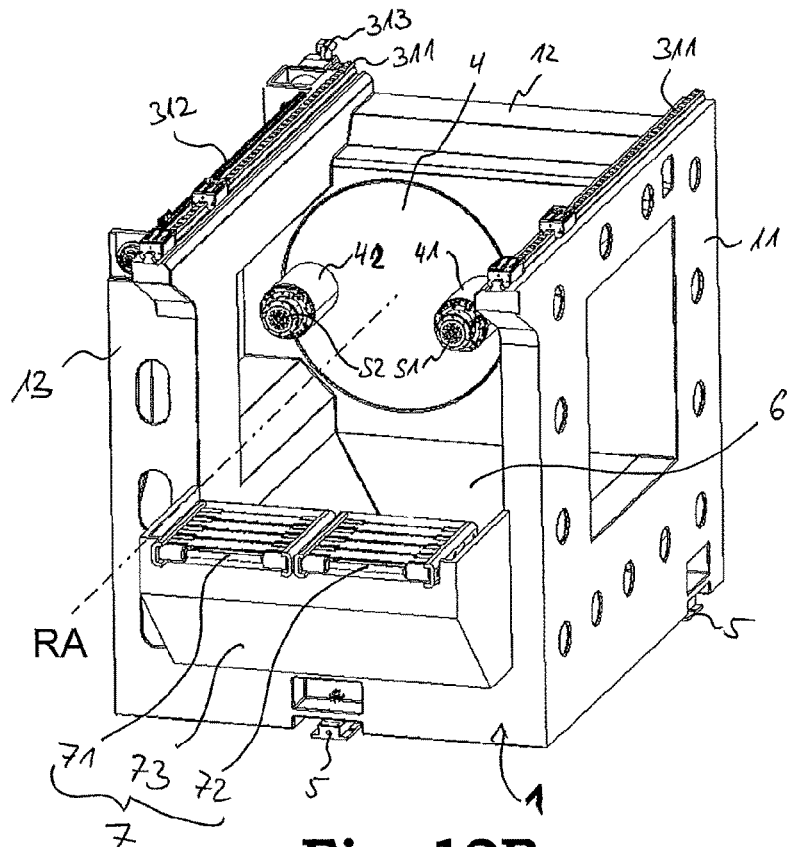
FIGS. 12A and 12B show exemplary perspective views of the machine tool frame of the machine tool from FIG. 1 (without axis slide assembly, tool magazine and tool change apparatus)
Figure 12B:
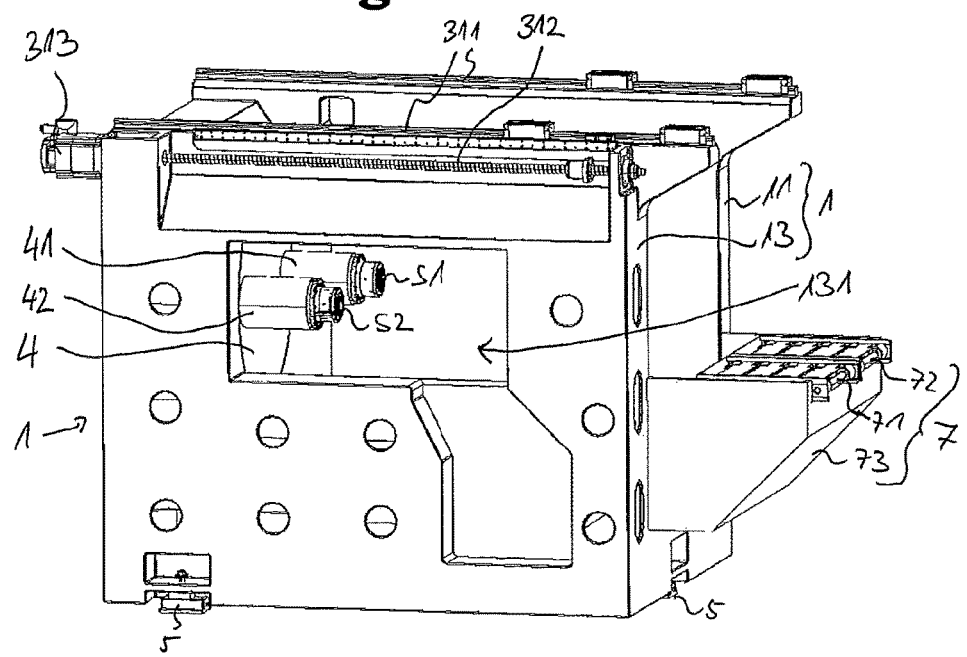
Figure 13:
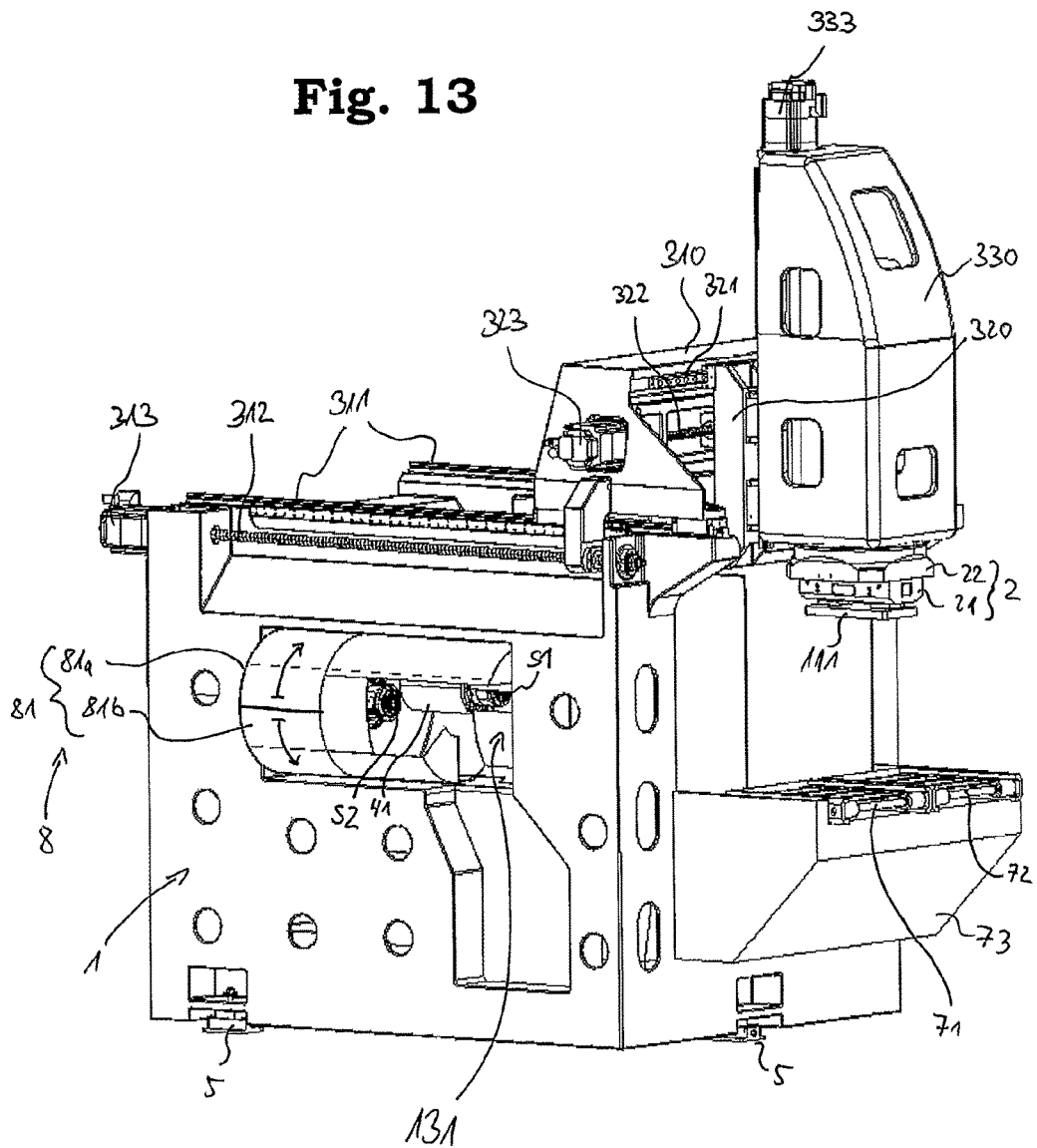
FIG. 13 shows an exemplary perspective view of the machine tool from FIG. 1 (without tool magazine and tool change apparatus)

Herein FIGS. 12A and 12B show exemplary perspective views of the machine tool frame of the machine tool from FIG. 1 (without axis slide assembly, tool magazine and tool change apparatus), and FIG. 13 shows an exemplary perspective view of the machine tool from FIG. 1 (without tool magazine and tool change apparatus).

The machine frame 1 comprises a first carrier portion 11 (on the right-hand side of the machine tool when viewed from the front), a second (rear) carrier portion 12 and a third carrier portion 13 (on the left-hand side of the machine tool when viewed from the front). By way of example, the first carrier portion 11 and the second carrier portion 12 of the machine frame 1 carry, e.g., an axis slide assembly 3 which is arranged, by way of example, above the machine frame 1.

As an example, the axis slide assembly 3 comprises a first axis slide 310 of the Z-axis 31, a second axis slide 320 of the X-axis 32 and a third axis slide 330 of the Y-axis 33.

As an example, the Z-axis 31 comprises along with the first axis slide 310 also first axis guides 311, on which, e.g., the first axis slide 310 is guided, a rotationally mounted first thread shaft 312 and a first axis drive 313 for the rotatory driving of the first thread shaft 312.

The first axis guides 311 extend, e.g., in the horizontal direction (Z-direction) which extends, by way of example, from the front side of the machine tool horizontally to the rear side of the machine tool and are arranged, by way of example, on the machine frame 1 and in particular on the carrier portions 11 and 12. The first thread shaft 312 and the first axis drive 313 are arranged, e.g., on the third carrier portion 13 of the machine frame 1 and the first thread shaft 312 extends, e.g., horizontally and parallel to the axis guide 311 running on the third carrier portion 13.

The first axis slide 310 rests, e.g., in horizontally linear and movable fashion on the first axis guides 311 and comprises, e.g., a threaded nut (not shown) placed on or attached to the first threaded spindle 312, and therefore a linear movement of the first axis slide 310 can be induced in the direction of the first axis guides 311 by way of the coupling via the first threaded spindle 312 through the first drive 313.

The X-axis 32 comprises, by way of example, along with the second axis slide 320 also second axis guides 321 on which the second axis slide 320 is guided in exemplary fashion, a rotationally mounted second thread shaft 322 and a second axis drive 323 for the rotatory driving of the second thread shaft 322.

As an example, the second axis guides 321 extend in a horizontal direction (X-direction) which extends, by way of example, from the left-hand side of the machine tool horizontally to the right-hand side of the machine tool and in particular, by way of example, perpendicularly to the Z-direction of the Z-axis 31 and are arranged, by way of example, on the first axis slide 310 of the Z-axis 31. The second thread shaft 322 and the second axis drive 323 are arranged, e.g., on the first axis slide 310 and the second thread shaft 322 extends, e.g., horizontally and in parallel to the axis guides 321 which run on the first axis slide 310.

The second axis slide 320 rests, e.g., in horizontally linearly movable fashion on the second axis guides 321 and comprises, by way of example, a threaded nut (not shown) placed on or attached to the second threaded spindle 322, and therefore a linear movement of the second axis slide 320 in the direction of the second axis guides 321 can be induced by way of the coupling via the second threaded spindle 322 using the second drive 323.

As an example, the Y-axis 33 comprises along with the third axis slide 330 also third axis guides 331, on which the third axis slide 330 is guided in exemplary fashion, a rotationally mounted second thread shaft 332 and a third axis drive 333 for the rotatory driving of the third thread shaft 332.

The third axis guides 331 extend, e.g., in a vertical direction (Y-direction), which extends, by way of example, perpendicularly to the Z-direction of the Z-axis 31 and perpendicularly to the X-direction of the X-axis 32 and are, e.g., arranged on the third axis slide 330 of the Y-axis 33. The third thread shaft 332 and the third axis drive 333 are arranged, e.g., on the third axis slide 330 and the third thread shaft 332 extends, by way of example, vertically and in parallel to (and between the) axis guides 331 running on the third axis slide 330.

As an example, the third axis slide 330 rests, e.g., in vertically linearly movable fashion with the third axis guides 331 on the second axis slide 320. The Y-axis 33 comprises, e.g., a threaded nut (not shown) which is held on the second axis slide 320 and is placed on or attached to the third threaded spindle 332, and therefore a linear movement of the third axis slide 330 can be driven in the direction of the third axis guides 331 at the second axis slide 320 by way of the coupling via the third threaded spindle 332 by the third drive 333.

On the lower side of the third axis slide 330, a workpiece clamping device 2 is arranged, by way of example, with a gripping device 21 held on a workpiece pallet holder 22. The gripping device 21 is configured to grip or clamp a workpiece pallet 111 in order to clamp a workpiece WS on the workpiece pallet holder 22 of the workpiece clamping device 2.

Here, the machine tool of the embodiment according to FIG. 1 is configured, by way of example, to machine workpieces WS by overhead machining on the machine tool, e.g., by clamping a workpiece WS mounted on a workpiece pallet 111 for the overhead machining on the machine tool in suspended fashion (or in a fashion where it hangs upside down) with an upwardly pointing workpiece pallet 111 at the workpiece pallet holder 22 of the workpiece clamping device 2; see, e.g., FIGS. 2, 3 and 6.

As a result of the suspended overhead machining of a workpiece WS, an advantageous result is an optimum chip falling behavior when a workpiece WS is machined since the chips can simply fall down without impediment where they can be collected, e.g., by a chip collection tank 6 having a simple shape (e.g., funnel-shaped, tank-shaped or box-shaped). No drive or machining components have to be arranged below the workpiece WS clamped in suspended fashion, which might be soiled by falling chips. Therefore, the chips fall down in an advantageous and unimpeded fashion, optionally in the entire machining area of the machine tool; see, in particular, the sectional view according to FIG. 5.

Here, in particular, no complicated and space-consuming, machine-integrated chip conveying mechanism has to be provided but it is fully sufficient in advantageous fashion to use in a space-saving way and with a simple and cost-effective design a simple chip conveyor (optionally according to a conventional design) which can easily be inserted via the conveyor portion directly into the chip discharge opening 121 in the rear carrier portion 12 of the machine frame 1, in particular without having to provide any further complex, expensive, machine-integrated chip conveying device.

As already described above, the machine frame 1 comprises, e.g., lateral first and third carrier portions 11 and 13 which carry, by way of example, the above described axis slide assembly 3 and a rear carrier portion 12 where, e.g., the above described chip discharge opening 121 is formed (see, e.g., FIGS. 4, 8 and 10).

As an example, a machining area of the machine tool is formed between the carrier portions 11, 12 and 13, it being possible to machine in said machining area a workpiece WS clamped at the above described workpiece clamping device 2. On the lower side of the machining area between the carrier portions 11, 12 and 13, e.g., the above described chip collection tank 6 is arranged (see, e.g., FIGS. 5, 7 and 8).

On the rear side of the machine tool, a rotationally mounted spindle-carrying turret 4 is held or arranged on the carrier portion 12 of the machine frame 1. The turret 4 is made, e.g., as a rotary disk. However, in further embodiments it can also be made, e.g., as a rotary drum as known, e.g., from multi-spindle lathes for workpiece-carrying spindles.

As an example, the turret 4 of the machine tool according to the embodiment from FIGS. 1 to 11 carries two tool-carrying work spindles S1 and S2, which are held and mounted, e.g., in rotationally drivable fashion in spindle housings 41 and 42. The spindle housings 41 and 42 preferably comprise in the interior thereof respective spindle drives (not shown) for driving the work spindles S1 and S2 or for rotationally driving tool interfaces or tools accommodated by the work spindles S1 and S2, in particular milling cutters or boring and drilling tools.

Figure 15A:
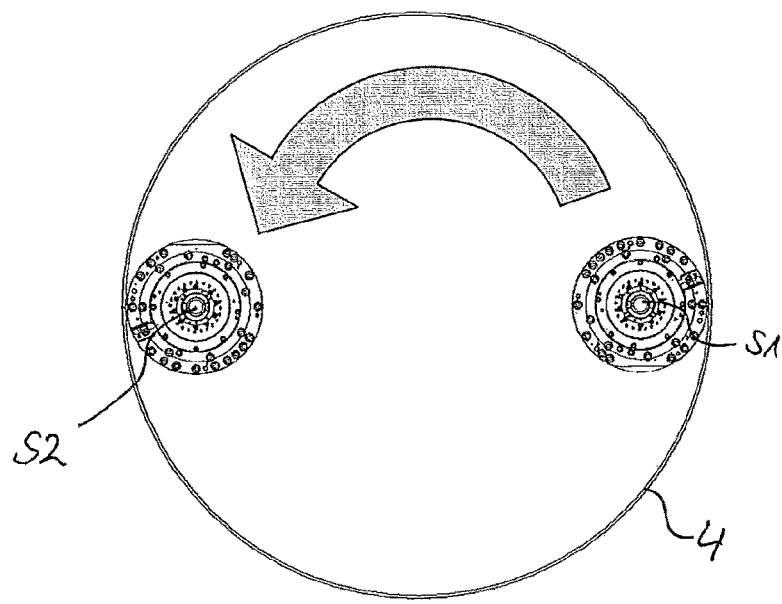
FIG. 15A shows an exemplary front view of a spindle turret of the machine tool from FIG. 1
Figure 15B:
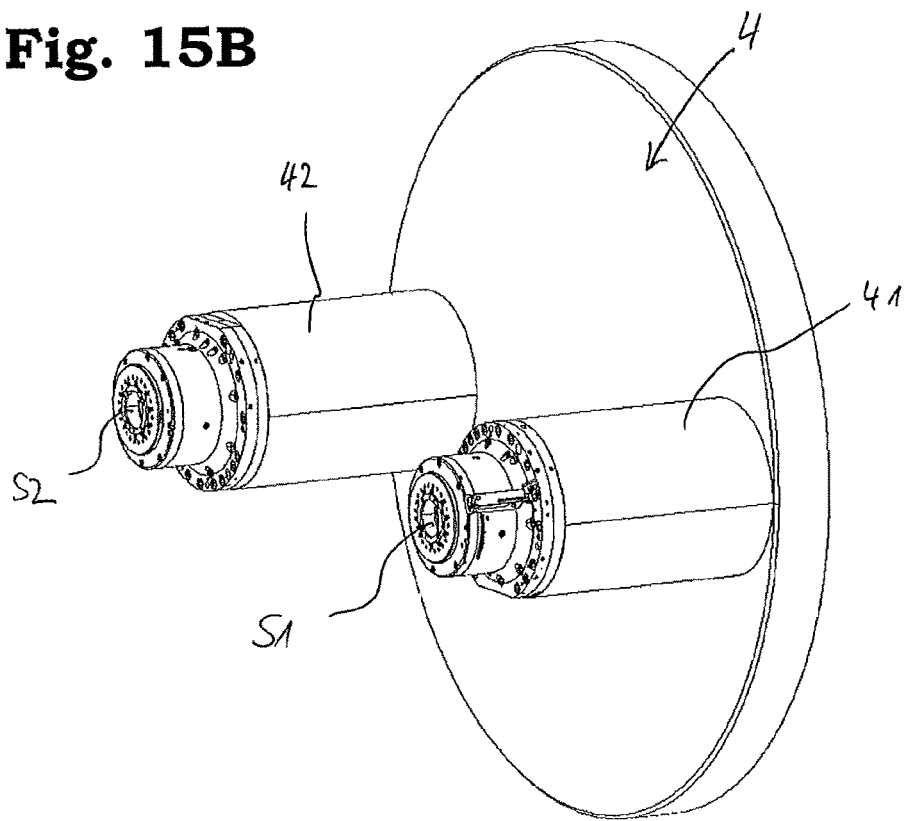
FIG. 15B shows an exemplary perspective view of the spindle turret of the machine tool from FIG. 1.

FIG. 15A shows an exemplary front view of the spindle turret 4 of the machine tool from FIG. 1 (e.g., made as a rotary disk) and FIG. 15B shows an exemplary perspective view of the spindle turret of the machine tool from FIG. 1.

In FIGS. 1, 2, 4, 5, 7, 8 and 9, the turret 4 is aligned, by way of example, in such a way that the first work spindle S1 is positioned in a work position (machining position) which is disposed, by way of example, in the center of the machining area between the carrier portions 11 and 13 of the machine frame 1; see FIGS. 5, 7, 9 and 12A or 12B.

By way of example, the second work spindle S2 is here positioned at a tool exchange position when the first work spindle S1 is positioned at the work position according to FIG. 1 (see, e.g., FIGS. 7, 8, 9 and 12A or 12B).

The turret 4 is made, by way of example, as a circular rotary disk which can be rotated or swiveled about the central turret axis on the carrier portion 12 of the machine frame 1. The work spindles S1 and S2 with their spindle housings 41 and 42 are arranged, by way of example, at equal distance from the center or the turret axis of the turret 4 and in particular, e.g., on opposite sides of the center or the turret axis of the turret 4.

Due to this, it is advantageously possible to rotate or swivel the first work spindle S1 from the machining position according to FIG. 1 into the tool change position by rotating or swiveling the turret 4 about the turret axis by an angle of 180° clockwise or also counterclockwise, at which the second work spindle S2 is positioned before the turret 4 is rotated, and to rotate or swivel the second work spindle S2 from the tool change position according to FIGS. 7 and 8 into the machining position at the same time with the same rotation of the turret 4 about the turret axis by an angle of 180°, at which the first work spindle S1 is positioned before the turret 4 is rotated. Therefore, an advantageously fast an efficient spindle position exchange can be made possible by the rotatable turret 4.

By analogy with the movement of the above described linear axis slides 310 to 330 of the axis slide assembly 3, the rotation of the turret can be controlled via a drive (not shown), e.g., via a numerical control device (CNC control unit and/or PLC control unit, optionally via an NC program or a manual input at a control panel of the numerical control by an operator).

As an example, furthermore a tool magazine 10 and a tool change apparatus 9 are provided for the tool exchange on the machine tool. The tool change apparatus 9 is arranged, e.g., on a tool change opening 131 in the third carrier portion 13 of the machine frame 1 (see, e.g., FIG. 13). The tool magazine 10 is arranged, e.g., on the outer side of the third carrier portion 13 of the machine frame 1 and, as an example, is held or mounted on the third carrier portion 13 via a tool magazine carrier 102.

As an example, the tool magazine 10 is made as a wheel-type magazine and comprises a tool-carrying magazine wheel 101 which is rotatably mounted and held on the tool magazine carrier 102 which, by way of example, is mounted or can be mounted on the carrier portion 13 of the machine frame 1. In further embodiments, the tool magazine carrier can also be made as a column or column frame which can optionally be installed separately from the machine frame 1 and independently next to or behind the machine tool.

It is pointed out that the present disclosure is by no means limited to machine tools with integrated tool magazine and that the present disclosure is also by no means limited to a certain design of a tool magazine, such as the wheel-type magazine merely shown, by way of example, in FIG. 1, and that, on the contrary, a plurality of different tool magazine types can be used in further embodiments, in particular, e.g., rack-type magazines, chain magazines, multiple wheel tool magazines or even hybrid tool magazines, which combine various types of tool magazines into one tool magazine.

Figure 14A:
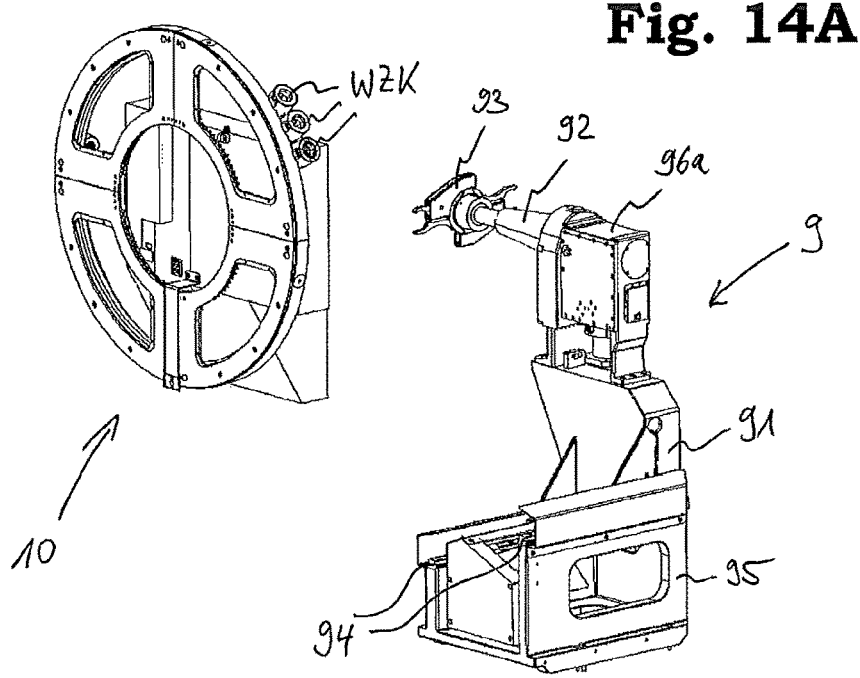
FIGS. 14A and 14B show exemplary perspective views of the tool magazine and the tool change apparatus of the machine tool from FIG. 1.
Figure 14B:
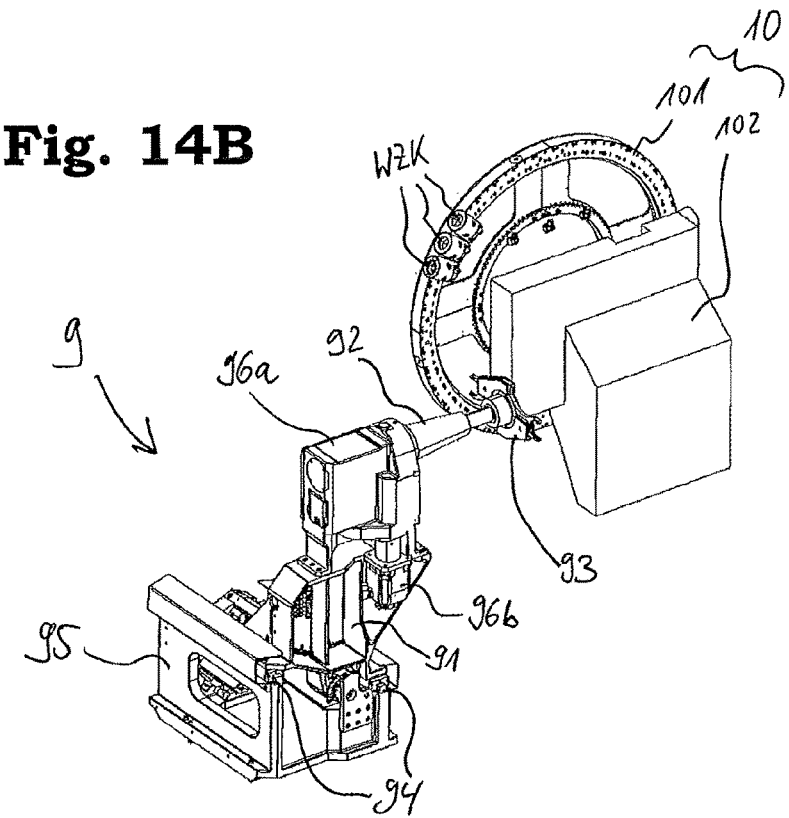

FIGS. 14A and 14B show exemplary perspective views of the tool magazine 10 and the tool change apparatus 9 of the machine tool from FIG. 1.

The wheel-type magazine or the magazine wheel 101 of the tool magazine 10 is configured to hold, store or have available along its circumference a plurality of tools or tool carrying tool interfaces (e.g., steep taper tool interfaces, hollow shaft cone tool interfaces and/or Morse taper tool interfaces), in particular preferably with radial orientation of the tool axes. For this purpose, the wheel-type magazine can comprise along the circumference at the magazine wheel thereof a plurality of tool receptacles WSK to accommodate tools or tool interfaces, see, e.g., FIGS. 14A and 14B.

The tool change apparatus 9 comprises, by way of example, a tool change slide carrier 95, which can be mounted or is mounted, e.g., on the third carrier portion 13 of the machine frame 1 of the machine tool according to FIG. 1, see, e.g., FIG. 1.

As an example, the tool change slide carrier 95 is provided, e.g., with horizontally extending tool change axis guides 94 which, e.g., run parallel to the direction of the above described X-axis 32, i.e., in particular, as an example, parallel to the second axis guides 321 horizontally from the left to the right. By way of example, a tool change axis slide 91 is guided in a linearly movable way on the tool change axis guide 94, and, e.g., a tool change drive housing 96a having a double gripper swivel drive 96b and a tool change gripping carrier 92 are arranged on the tool change axis slide 91, the tool change gripping carrier 92 holding, e.g., a rotatably mounted tool change double gripper 93, which can be swiveled by the double gripper swivel drive.

The tool change double gripper 93 is here made, by way of example, as a conventional double gripper which has on opposite sides respective gripping portions for tools or tool interfaces, which are, e.g., suitable to engage in gripper grooves of the tool interfaces in order to remove tools from the tool magazine 10 or insert them into the tool magazine or in order to remove tools from the work spindle S2 positioned at the tool change position or insert them into the work spindle and exchange them by swiveling the tool change double gripper 93 by 180° clockwise or counterclockwise.

For this purpose, the tool change double gripper 93 can preferably also be moved along the tool changer gripper carrier 92 horizontally in a direction parallel to the direction of the Z-axis or parallel to the spindle axes. The movability of the tool change axis slide 91 makes possible in advantageous fashion the movement of the tool change gripper carrier 92 with the tool change double gripper 93 between a removal position on the tool magazine 10 and the tool change position of the machine tool.

A major advantage of the machine tool according to the embodiment of FIGS. 1 to 11, is now the possibility to exchange a tool accommodated at the work spindle S2, which is located at the tool change position of the machine tool (see, e.g., FIG. 7) while at the same time the workpiece WS clamped at the tool clamping device 2 is machined by way of a tool accommodated at the work spindle S1, which is disposed at the machining position of the machine tool (see, e.g., FIG. 7).

As soon as the workpiece WS clamped at the workpiece clamping device 2 shall be machined with the tool inserted at the work spindle S2, the work spindle S2 can be moved, by way of example, by the tool to be used by a simple and fast swiveling action of the turret 4 by 180° clockwise or counterclockwise with spindle exchange times of about 1 or 2 seconds from the tool change position to the machining position, and therefore the machining of the workpiece WS can be continued virtually without any tool exchange time. At the same time, the work spindle S1 can be moved to the tool change position in the same step, and therefore a tool change is possible at the work spindle S1 without having to noticeable interrupt the machining of the workpiece.

As soon as the workpiece WS clamped at the workpiece clamping device 2 shall be machined with the tool then changed at the work spindle S1, the work spindle S1 can be used again with the tool to be used by a simple and fast swiveling action of the turret 4 by 180° clockwise or counterclockwise with spindle change times of about 1 or 2 seconds again from the tool change position to the machining position, and therefore the machining of the workpiece WS can be further machined again virtually without any tool change time.

This results in an excellently efficient machining time for the machining of the workpiece WS, even if many work steps with a large number of tool changes should be necessary optionally in close succession, and this virtually without any stand-still times of the machine tool as usually occur in tool changes on machine tools, and in addition with an excellently advantageously possible compact design of the machine tool.

As an example, the machine tool according to the embodiment of FIGS. 1 to 11 also comprises a protection cap mechanism 8 (see, e.g., FIGS. 1, 2, 4, 6 and 8 and 13) which can optionally be opened and closed automatically.

In the open state, the protection cap mechanism 8 makes possible, e.g., the swiveling action of the turret 4 with the work spindles S1 and S2 to change the spindle position between the machining position and the tool changing position, and in the closed state the closed protection cap mechanism 8 advantageously covers, e.g., the work spindle positioned at the tool change position when viewed from the machining area of the machine tool.

The protection cap mechanism 8 here preferably separates in the closed state the work spindle positioned at the machine tool position advantageously completely from the machining area of the machine tool.

The protection cap mechanism 8 is preferably arranged or mounted on or in the tool change opening 131 formed in the carrier portion 13 of the machine frame 1, preferably in such a way that in the closed state the protection cap mechanism 8 closes the tool change opening 131 formed in the carrier portion 13 of the machine frame 1 towards the machining area, wherein the work spindle positioned at the tool change position is preferably arranged on the side of the closed protection cap mechanism 8 or a protection cover mechanism of the closed protection cap mechanism 8, said side facing away from the machining area, and which is arranged on the work spindle positioned at the machining position or work position on the side of the closed protection cap mechanism 8 or a protection cover portion of the closed protection cap mechanism 8, said side facing the machining area.

As an example, the protection cap mechanism 8 of the machine tool according to FIGS. 1 to 11 comprises partial cylinder body 81 including protection cover portions with partial cylinder portions, which is rotatably mounted, by way of example, in the tool change opening 131 of the carrier portion 13 of the machine frame 1, in particular about an axis of rotation in parallel to the turret axis of the turret 4 or the spindle axes. In the open state, the partial cylinder body 81 has openings which open the interior of the partial cylinder body 81 to the machining area and to the tool magazine; see, e.g., FIG. 13 in which the spindles S1 and S2 are visible from outside through the openings of the partial cylinder bodies 81.

The opening of the partial cylinder body 81, facing the tool magazine 10, makes possible in the open state of the protection cap mechanism 8, e.g., a supply of the tool or the tool interface by way of the tool change apparatus 9 from the tool magazine 10 to the tool change position, and the opening of the partial cylinder body 81 facing the machining area makes possible in the open state of the protection cap mechanism 8 advantageously the spindle exchange or the spindle position exchange by rotating or swiveling the turret 4.

The opening of the partial cylinder body 81, facing the machining area, can be seen in the open state of the protection cap mechanism 8, e.g., in the sectional view from FIG. 8, wherein in this sectional plane the partial cylinder body 81 includes the opening to the machining area, e.g., on the right-hand side and in particular has, e.g., a part-circle cross-section which has, e.g., a crescent shape fitted to the, e.g., circular shape of the turret 4. Here, it is seen, by way of example, that a swiveling action of the partial cylinder body 81 for closing the protection cap apparatus 8 advantageously makes possible to cover the work spindle S2 in the tool change position and to spatially separate it from the machining area and the work spindle S1 in the machining position.

In order to also make possible in an advantageous way that a supply or removal of tools or tool interfaces between the tool magazine 10 and the tool change position is possible in the closed state of the protection cover apparatus 8, the partial cylinder body 81 of the protection cover has, e.g., two separate partial cylinder body portions 81a and 81b which in the open state are arranged preferably above and below the tool change position, wherein the respective openings are formed between the first and second partial cylinder body portions 81a and 81b towards the tool magazine 10 and towards the machining area of the machine tool.

The first and second partial cylinder body portions 81a and 81b are preferably configured to close the protection cover apparatus 8 by swiveling them towards the machining area downwards and/or upwards (see, e.g., FIG. 13, wherein the open position is shown, by way of example). For example, the first (upper) partial cylinder body portion 81a (in general: first protection cover portion) can be swiveled to the machining area and downwards—in FIG. 13, e.g., clockwise —, and by way of example, the second (lower) partial cylinder body portion 81b (in general: second protection cover portion) can be swiveled upwards towards the machining area—in FIG. 13, e.g., counterclockwise—preferably in such a way that the first and second protection cover portions are closed with each other on the side of the machining area.

Here, only the side of the tool change position that faces the machining area is separated from the machining area, wherein the side of the tool changing position that faces the tool magazine remains accessible, e.g., to be advantageously moved even with closed protection cover apparatus 8 by way of the tool change apparatus or the tool changer axis slide 91 and the tool change double gripper 93 between the tool magazine 10 and the tool change position of the machine tool and to be able to change tools at the work spindle positioned at the tool change position.

Furthermore, the machine tool according to the embodiment of FIGS. 1 to 11 comprises, by way of example, a conveying device 7, which is arranged or held, e.g., on a front side of the machine frame 1 on a conveying device carrier portion 73. The conveying device carrier portion 73 is provided in FIGS. 1 to 11, by way of example, as a further portion of the machine frame 1, and therefore the machine frame 1 has, e.g., along with the carrier portions 11 to 13 also the conveying device carrier portion 73, the machining area of the machine tool being preferably formed between the opposite carrier portions 11 and 13 and between the opposite carrier portions 12 and 73.

The conveying device 7 comprises, by way of example, an input conveying portion 71 for the optionally automatic supply of a workpiece to be machined to the machining area of the machine tool and, by way of example, an output conveying portion 72 for the optionally automatic discharge or removal of a machined workpiece from the machining area of the machine tool.

The input conveying portion 71 of the conveying device 7 can have, e.g., a workpiece clamping position (clamping position) at which a workpiece WS to be machined can be accommodated and clamped by the workpiece clamping device 2, e.g., after the workpiece clamping device 2 has placed down or could place down a previously clamped and already machined workpiece WS at a workpiece unclamping or output position (unclamping position) in order to optionally convey it automatically away by the output conveying portion 72 of the conveying device 7, said output conveying portion including the workpiece unclamping or output position.

In front of the input and output conveying portions 71 and 72 of the conveying device 7, the conveying device 7 can preferably comprise one or more further conveying portions, e.g., to convey workpieces to the input conveying portion 71 of the conveying device 7 and/or to convey workpieces away from the output conveying portions 72 of the conveying device 7.

In the embodiment according to FIGS. 1 to 11, the input and output conveying portions 71 and 72 of the conveying device 7 are made, by way of example, as roller conveyor portions, however, the present disclosure is not limited to such embodiments and the conveying device 7 can comprise additionally or alternatively also different conveyor portions and/or be provided in further embodiments of the machine tool with additional or alternative automation machines, handling machines, manipulators and/or pick-up robot devices to optionally remove and/or provide workpieces automatically.

As already described, FIG. 15A shows an exemplary front view of a spindle turret 4 of the machine tool from FIG. 1 and FIG. 15B shows an exemplary perspective view of the spindle turret 4 of the machine tool from FIG. 1. As already described above, the spindle turret 4 carries, by way of example, the work spindles S1 and S2 held or arranged in the spindle housings 41 and 42.

According to FIG. 15A, the work spindle S2 is positioned, by way of example, at the left-hand tool change position and the work spindle S1 is positioned at the right-hand work position or machining position, and they are arranged with respect to the central axis (turret axis) of the turret 4 in opposite fashion (i.e., in particular on a plane running through the central axis), e.g., the spindle axes each being aligned parallel to the central axis (turret axis) of the turret 4. In addition, the work spindles S1 and S2 are arranged, by way of example, on the turret 4 at an equal radial distance from the central axis (turret axis) of the turret 4.

The significant advantage is that a swiveling action or rotation of the turret 4 about the central axis (turret axis) thereof by 180 degrees clockwise or also counterclockwise can change the spindle positions efficiently, with precision and rapidly, in particular in such a way that the first work spindle S1 can be moved to the position previously adopted by the second work spindle S2 (tool change position) and the second work spindle S2 can simultaneously be moved to the position previously adopted by the first work spindle S1 (work or machining position).

However, the present disclosure is by no means limited to such a double spindle system but, e.g., more than two spindles, i.e., e.g., three, four, five, six, seven, eight or more spindles, can be provided on a turret (e.g., made as a rotary disk or carrier drum) in further embodiments. Here, it is always preferred—but not always necessary—for the spindles to be all arranged at an equal angular distance from one another on the turret, i.e., in particular preferably with N spindles preferably at an angle of 360/N degrees (i.e., e.g., 180 degrees with two spindles, such as in FIG. 15A, 120 degrees with three spindles, such as in FIG. 16; 90 degrees with four spindles; 60 degrees with six spindles, etc.).

Figure 16:
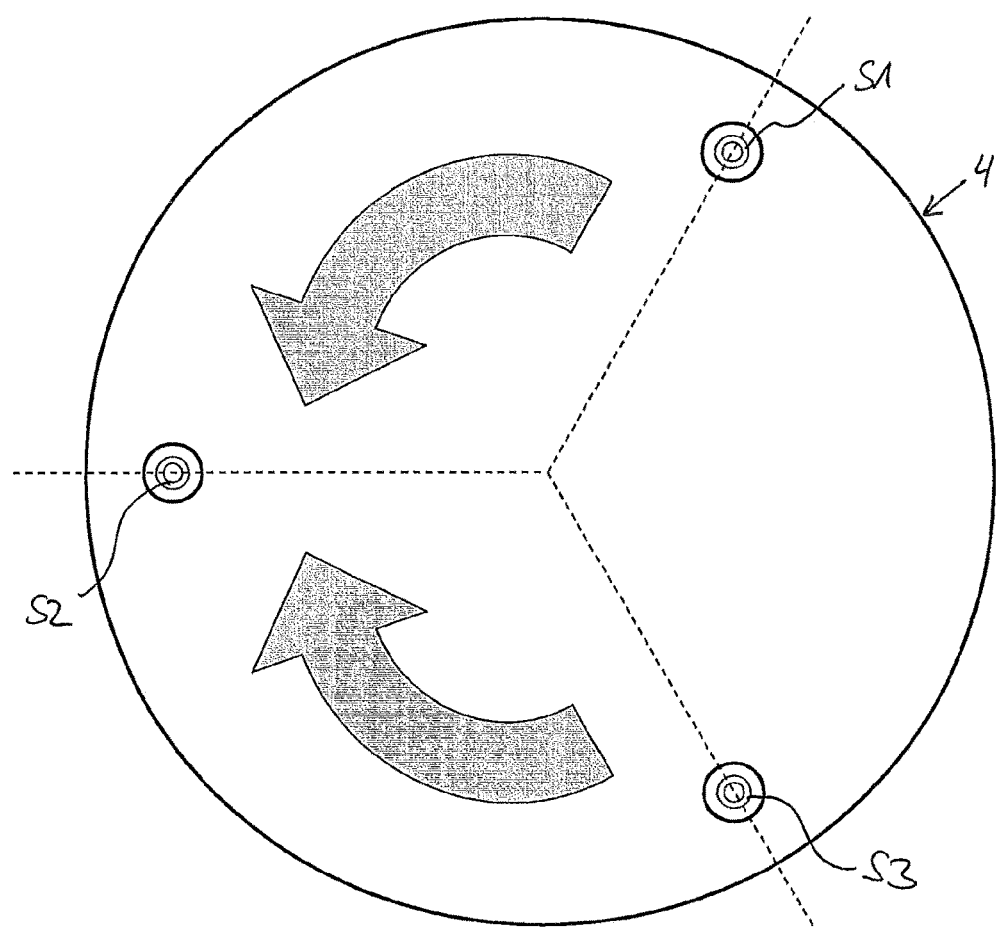
FIG. 16 shows an exemplary front view of a spindle turret of a machine tool according to a further embodiment of the disclosure.

FIG. 16 shows an exemplary front view of a spindle turret 4 of a machine tool according to a further embodiment of the disclosure with a triple spindle system (e.g., for a triple spindle milling machine).

Here, a first work spindle S1, a second work spindle S2 and a third work spindle S3 are provided by way of example, which are arranged, e.g., at respective angular distances of 120 degrees in relation to one another on the turret 4. Furthermore, the three work spindles S1 to S3 are arranged, by way of example, on the turret 4 at an equal radial distance from the central axis (turret axis) of the turret 4. In addition, the three work spindles S1 to S3 are arranged, by way of example, in such a way that the respective spindle axles thereof are all aligned (or can be aligned) in parallel to one another and are aligned (or can be aligned) in parallel to the central axis (turret axis) of the turret 4.

By analogy with the turret 4 according to FIG. 15A, it might be assumed that the second work spindle S2 is positioned at a work change position and the first work spindle S1 is positioned at a machining position in such a way that at the machining position the first work spindle S1 is configured to be able to machine a workpiece clamped at the workpiece clamping device 2 while an exchange and/or a replacement can be carried out at the second work spindle S2 at the tool change position.

The first work spindle S1 can be moved to the tool change position by swiveling or rotating the turret 4 in FIG. 16 by 120 degree counterclockwise, the third work spindle S3 being simultaneously moved to the machining position where the first work spindle S1 was positioned beforehand; and by swiveling or rotating the turret 4 in FIG. 16 by 120 degrees clockwise, the second work spindle S2 can be moved to the machining position where the first work spindle S1 was positioned beforehand, the third work spindle S3 being simultaneously moved to the tool change position.

Here, the work spindle which is always positioned at the position of the work spindle S3 in FIG. 16 can optionally be positioned in a rest position in which it does not interfere with the machining of the workpiece. In further embodiments (in particular preferably in embodiments clamped in "normal" orientation of the workpiece, e.g., on a rotary table in upright fashion instead of an overhead clamping according to FIGS. 1 to 11) the position of the first work spindle S1 in FIG. 16 can also correspond to the rest position and the position of the third work spindle S3 in FIG. 16 can correspond to the machining position.

Furthermore, it is conceivable with "normal" or lateral workpiece clamping and also with overhead clamping of the workpiece that the position of the second work spindle S2 in FIG. 16 corresponds to the tool change position, the positions of the first and/or third work spindle correspond to the tool change position or two tool change positions (wherein tools can be optionally changed or removed at one of the two or at both spindles at tool change positions). Here, e.g., with N spindles 1 to M (with M<N) tool change positions can optionally be provided with 1 to M tool change manipulators or tool change grippers or with tool change apparatuses with one or more tool change manipulators or tool change grippers for approaching the 1 to M tool change positions. In addition, 1 to N−M machining positions or 1 to N−M−1 rest positions can then be provided.

In FIG. 16, it is also possible for both spindles S1 and S3 to be arranged at machining positions, e.g., for the simultaneous machining of a workpiece (e.g., drilling of two holes at the same time) or at machining positions for two workpieces clamped one below the other or on top of one another (e.g., a second one below and suspended in clamped fashion at the first workpiece or also an overhead clamped workpiece and a workpiece clamped under this suspended clamped workpiece in upright fashion.

Figure 17A:
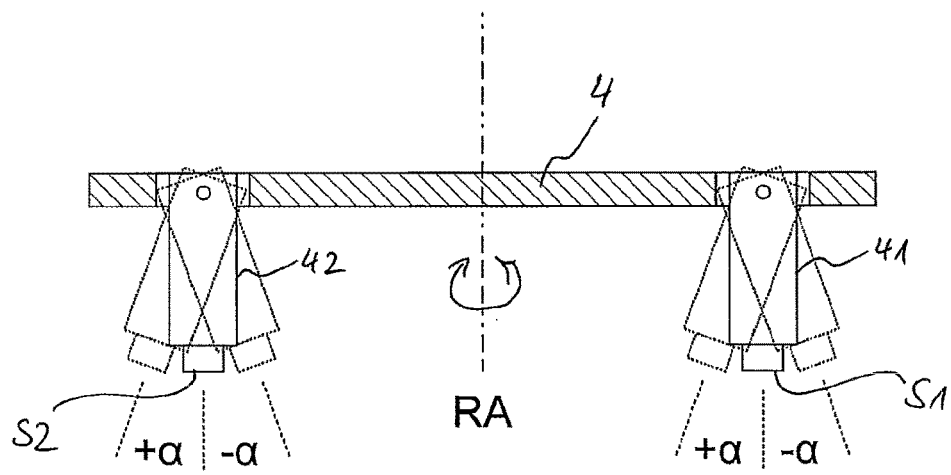
FIG. 17A shows an exemplary sectional view with horizontal sectional plane through a spindle turret of a machine tool according to a further embodiment of the disclosure.

FIG. 17A shows an exemplary sectional view with a horizontal sectional plane through a spindle turret 4 of a machine tool according to a further embodiment of the invention.

Here, two spindles S1 and S2 with spindle housings 41 and 42 are provided, by way of example, by analogy with FIGS. 15A and 15B, which are positioned in a tool change position and a machining position and can be rotated about the turret axis RA by rotating the turret 4 about the turret axis RA.

As an example, these work spindles S1 and S2 are also configured to be swiveled in an exemplary horizontal plane (FIG. 17A shows a top view) in such a way that the respective spindle axes thereof are aligned parallel to the turret axis and can be swiveled in relation to the turret axis in the plane of the spindle axes common with the turret axis RA by an angle of $+\alpha$ and/or $-\alpha$.

Figure 17B:
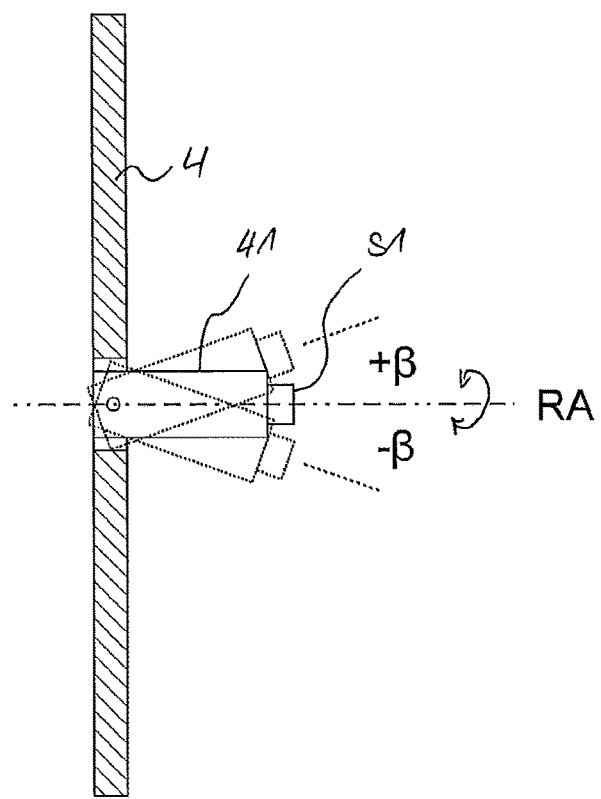
FIG. 17B shows an exemplary sectional view with a vertical sectional plane through a spindle turret of a machine tool according to a further embodiment of the disclosure.

FIG. 17B shows an exemplary sectional view with a vertical sectional plane through a spindle turret 4 of a machine tool according to a further embodiment of the invention.

Here, two spindles S1 and S2 with spindle housings 41 and 42 are provided by analogy with FIGS. 15A and 15B in exemplary fashion (only one of the spindles being shown, by way of example, on account of the side view), which are positioned, e.g., in the tool change and machining position and can be rotated about the turret axis RA by rotating the turret 4 about the turret axis RA.

These work spindles S1 and S2 are also configured, by way of example, in a respective exemplary vertical plane (FIG. 17B shows a side view) to be swiveled in such a way that the respective spindle axes thereof can be aligned parallel to the turret axis and can be swiveled in relation to the turret axis vertically about an angle of $+\beta$ and/or $-\beta$.

In further embodiments, it is possible to combine the embodiments from FIGS. 17A and 17B in such a way that one or both spindles can be swiveled vertically and horizontally or only one spindle can be swiveled vertically and/or only one spindle can be swiveled horizontally.

Figure 17C:
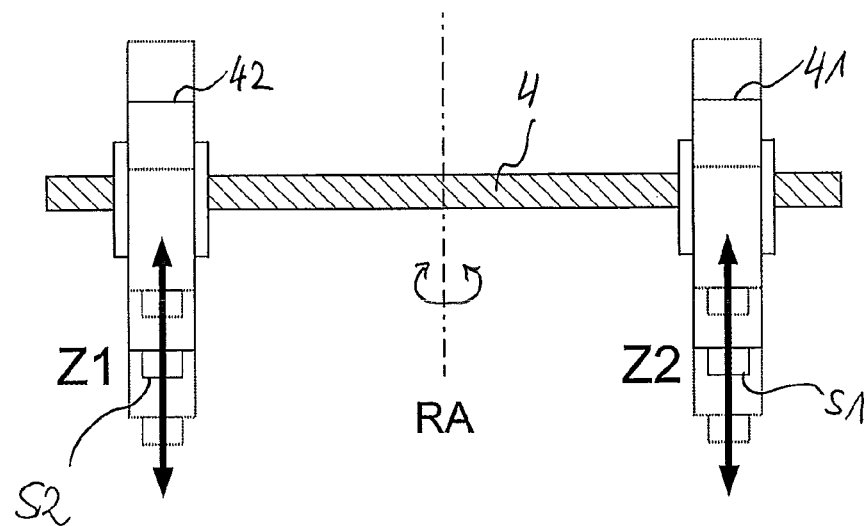
FIG. 17C shows an exemplary sectional view with horizontal sectional plane through a spindle turret of a machine tool according to a further embodiment of the disclosure.

FIG. 17C shows an exemplary sectional view with horizontal sectional plane through a spindle turret 4 of a machine tool according to a further embodiment of the invention.

As an example, two spindles S1 and S2 having spindle housings 41 and 42 are here provided by analogy with FIGS. 15A and 15B and are positioned, by way of example, in a tool change position and a machining position and can be rotated about the turret axis RA by rotating the turret 4 about the turret axis RA.

As an example, these work spindles S1 and S2 are also configured to be moved in the direction Z1 and Z2 of their respective spindle axes, which, by way of example, are aligned in parallel to the turret axis RA, preferably independently of one another. In further embodiments, only one of the spindles can be moved in the direction of the spindle axis, and one, several or all respective work spindles can preferably be Z-movable independently of one another in the above described embodiments (i.e., in the direction of the spindle axis and/or in the direction of the turret axis).

If one or both spindles are Z-movable on the machine tool according to FIG. 1, the axis slide 310 and the controllable Z-axis thereof might optionally be omitted in further embodiments to be able to make the machine tool even more compact.

Figure 18:
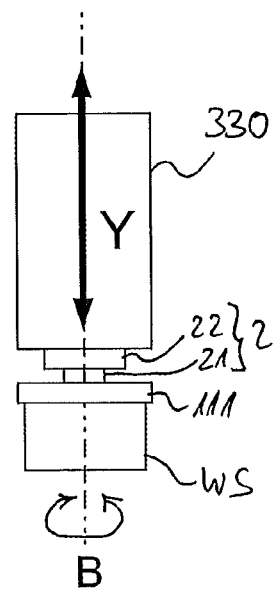
FIG. 18 shows an exemplary front view of a tool carrier axis slide of a machine tool according to a further embodiment of the disclosure.

FIG. 18 shows an exemplary front view of a tool carrier axis slide 330 of a machine tool according to a further embodiment of the invention. This corresponds by way of diagram to the embodiment according to FIGS. 1 to 11, with an additional exemplary controllable B-axis (preferably made as a rotary axis or also as a swivel axis or preferably 360 degrees swivel axis) being illustrated which is configured to rotate the workpiece WS clamped on the workpiece clamping device 2 about an exemplary vertically aligned (i.e., e.g., parallel to the Y-direction of the Y-axis) axis of rotation.

FIG. 19A show an exemplary front view of a tool carrier axis slide 330 of a machine tool according to a further embodiment of the disclosure and FIGS. 19B and 19C show exemplary side views of the tool carrier axis slide 330 from FIG. 19A.

Here, a swivel element 340 of a horizontally aligned controllable A-axis (swivel axis), which can be swiveled about an axis of rotation aligned in horizontal or perpendicular fashion in relation to the Y-direction or direction of the Y-axis, is provided at the tool carrier axis slide 330.

As an example, the gripping device 21 and the workpiece pallet holder 22 or the tool clamping device 2 are/is held at the swivel element 340, which is preferably also configured—by way of an additional controllable B-axis (preferably made as a rotary axis or also made as a swivel axis or preferably 360 degrees swivel axis)—to rotate the workpiece WS clamped at the workpiece clamping device 2 about an axis of rotation which is aligned, e.g., vertically in relation to the swivel element 340.

As an example, the swivel element 340 is configured to swivel the workpiece clamping device 2 about an axis of rotation aligned horizontally or perpendicularly in relation to the Y-direction or direction of the Y-axis; see FIG. 19C.

FIGS. 20A and 20B show exemplary front views of a tool carrier axis slide 330 of a machine tool according to a further embodiment of the invention.

As an example, a swivel element 340 of a vertically aligned controllable B axis (rotary axis or swivel axis), which can be swiveled about an axis of rotation vertically aligned or parallel aligned in relation to the Y-direction or direction of the Y-axis is here provided at the tool carrier axis slide 330.

The gripping device 21 and the tool pallet holder 22 are, or the workpiece clamping device 2 is, held by way of example in laterally suspended fashion at the swivel element 340, which is also preferably configured—by way of an additional controllable A-axis (preferably made as a rotary axis or also made as a swivel axis or preferable 360 degrees swivel axis)—to rotate the workpiece WS clamped, by way of example, in laterally suspended fashion at the workpiece clamping device 2 about an axis of rotation aligned, e.g., horizontally in relation to the swivel element 340.

As an example, the swivel element 340 is configured to rotate or swivel the workpiece clamping device 2 about an axis of rotation which is aligned vertically or is aligned in parallel to the Y-direction or the direction of the Y-axis.

Numerous examples and embodiments of the present disclosure as well as the advantages thereof have been described in detail above with reference to the enclosed drawings. It is here pointed out again that the present disclosure is by no means limited or restricted to the above described embodiments and the embodiment features thereof but also comprises modifications of the embodiments, in particular those comprised by modifications of the features of the described examples or by combination of individual or several of the features of the described examples on the basis of the scope of the independent claims.

In summary, a machine tool concept is proposed which makes it advantageously possible to create in an advantageous, extraordinary and novel way a precisely operating, cost-effective, extremely compact and efficient machine tool having optimally minimized down times, in particular since in each case at least one (or several) of the spindles can machine a workpiece at a respective working position while at least at one other spindle (or at several other spindles) a tool exchange can be carried out at a respective tool change position without interrupting the machining action of the workpiece or the workpieces due to the tool exchange, the individual interruptions of the actual machining of the workpiece or workpieces being given by the extremely fast (in particular at about one to two seconds or even less than a second) turret rotations of the turret.

LIST OF REFERENCE SIGNS 1 machine frame
11 first carrier portion
12 second carrier portion
121 chip discharge opening
13 third carrier portion
131 tool change opening
2 workpiece clamping device
21 gripping device
22 workpiece pallet holder
3 axis slide assembly
31 Z-axis
310 first axis slide
311 first axis guides
312 first thread shaft
313 first axis drive
32 X-axis
320 second axis slide
321 second axis guides
322 second thread shaft
323 second axis drive
33 Y-axis
330 third axis slide
331 third axis guides
332 third thread shaft
333 third axis drive
340 swivel element
4 spindle turret/turret
RA turret axis
41 first spindle housing
42 second spindle housing
S1 first work spindle
S2 second work spindle
S3 third work spindle
5 pedestal elements
6 chip collecting tank
7 conveying device
71 input conveying portion
72 output conveying portion
73 conveying device carrier portion
8 protective cover apparatus 81 protective cover
81a first protective cover portion
81b second protective cover portion
9 tool change apparatus
91 tool change axis slide
92 tool change gripper carrier
93 tool change double gripper
94 tool change axis guides
95 tool change slide carrier
96a tool change drive housing
96b double gripper swivel drive
10 tool magazine
101 magazine wheel
102 tool magazine carrier
111 workpiece pallet
WS workpiece
WZK tool receptacle
A second rotary axis or swivel axis
B first rotary axis or swivel axis

The invention claimed is:

1. A machine tool, comprising:
a machine frame;
a workpiece clamping device for clamping a workpiece;
an axis slide assembly which is arranged on the machine frame and which is configured to linearly move the workpiece clamped at the workpiece clamping device by way of three controllable linear axes; and
a spindle carrier assembly which is arranged on the machine frame and has at least two tool-carrying work spindles;
wherein the work spindles are arranged on a turret which can be rotated or swiveled about a turret axis at respectively equal distance from the turret axis and the spindle axes of the work spindles are aligned or can be aligned in parallel to one another and in parallel to the turret axis,
wherein the axis slide assembly is also configured to rotate the workpiece clamped at the workpiece clamping device by way of a controllable first rotary axis or swivel axis about a first axis of rotation,
wherein the axis slide assembly is also configured to rotate the workpiece clamped at the workpiece clamping device by way of a controllable second rotary axis or swivel axis about a second axis of rotation which is aligned transversely or perpendicularly to the first axis of rotation,
wherein the second axis of rotation of the second rotary axis or swivel axis is aligned horizontally, and
wherein the turret axis of the rotatable turret is aligned horizontally and the horizontally aligned, second axis of rotation of the second rotary axis or swivel axis is aligned in parallel or perpendicularly to the turret axis of the rotatable turret.

2. The machine tool according to claim 1, wherein the machine frame forms a machining area and the axis slide assembly is arranged above the machining area on the machine frame, and
wherein the workpiece clamping device is held at the axis slide assembly and is configured to clamp the workpiece and/or a workpiece pallet holding the workpiece in suspended or laterally suspended fashion for the overhead machining of the workpiece clamped at the workpiece clamping device in suspended fashion.

3. The machine tool according to claim 2, wherein the workpiece clamping device comprises a suspended rotary table with vertical axis of rotation and/or a gripping device which can be rotated about a vertical axis of rotation in order to grip the workpiece or the workpiece pallet in suspended fashion.

4. The machine tool according to claim 3, wherein the rotary table and/or the gripping device of the workpiece clamping device can be rotated or swiveled about a horizontal rotary axis or swivel axis.

5. The machine tool according to claim 2, wherein the workpiece clamping device comprises a rotary table with horizontal rotary axis or swivel axis and/or a gripping device which can be rotated about a horizontal axis of rotation in order to grip in laterally suspended fashion the workpiece and/or workpiece pallet.

6. The machine tool according to claim 5, wherein the rotary table and/or the gripping device of the workpiece clamping device can be rotated or swiveled about a vertical rotary axis or swivel axis.

7. The machine tool according to claim 2, further comprising a conveying device for conveying workpieces having an upwardly or laterally aligned workpiece pallet to a clamping position into a machining area of the machine tool for accommodation by the workpiece clamping device from above for the suspended or laterally suspended clamping of one of the workpieces at the workpiece clamping device, and for conveying one of the workpieces with an upwardly or laterally aligned workpiece pallet from an unclamping position out of the machining area of the machine tool after releasing the workpiece from the suspended or laterally suspended clamping by the workpiece clamping device.

8. The machine tool according to claim 1, wherein the first axis of rotation of the first rotary axis or swivel axis is aligned vertically.

9. The machine tool according to claim 1, wherein a first tool-carrying work spindle and a second work spindle of the at least two tool-carrying work spindles are arranged in relation to the turret axis on the opposite side at the rotatable turret, the turret axis being aligned horizontally.

10. A machine tool, comprising:
a machine frame;
a workpiece clamping device for clamping a workpiece;
an axis slide assembly which is arranged on the machine frame and which is configured to linearly move the workpiece clamped at the workpiece clamping device by way of three controllable linear axes; and
a spindle carrier assembly which is arranged on the machine frame and has at least two tool-carrying work spindles;
wherein the work spindles are arranged on a turret which can be rotated or swiveled about a turret axis at respectively equal distance from the turret axis and the spindle axes of the work spindles are aligned or can be aligned in parallel to one another and in parallel to the turret axis,
wherein a first tool-carrying work spindle and a second work spindle of the at least two tool-carrying work spindles are arranged in relation to the turret axis on the opposite side at the rotatable turret, the turret axis being aligned horizontally, and
wherein the first work spindle is positioned at a machining position of the machine tool when the second work spindle is positioned at a tool change position of the machine tool, and the second work spindle is positioned at the machining position of the machine tool when the first work spindle is positioned at the tool change position of the machine tool.

11. The machine tool according to claim 10, wherein the spindle carrier assembly is configured to exchange the positioning of the first work spindle at the work position or tool change position according to claim 10 by swiveling the rotatable turret about the turret axis by 180° with the positioning of the second work spindle at the tool change position or machining position according to claim 10.

12. A machine tool, comprising:
a machine frame;
a workpiece clamping device for clamping a workpiece;
an axis slide assembly which is arranged on the machine frame and which is configured to linearly move the workpiece clamped at the workpiece clamping device by way of three controllable linear axes; and
a spindle carrier assembly which is arranged on the machine frame and has at least two tool-carrying work spindles;
wherein the work spindles are arranged on a turret which can be rotated or swiveled about a turret axis at respectively equal distance from the turret axis and the spindle axes of the work spindles are aligned or can be aligned in parallel to one another and in parallel to the turret axis, and
wherein a number N of tool-carrying work spindles with N>2 are arranged at a respective angular distance of an angle α=360°/N on the rotatable turret, the turret axis being aligned horizontally.

13. The machine tool according to claim 12, wherein a first work spindle of the N work spindles is positioned at a machining position of the machine tool when a second work spindle of the N work spindles is positioned at a tool change position of the machine tool.

14. The machine tool according to claim 13, wherein the spindle carrier assembly is configured to swivel the first work spindle by rotating the rotatable turret about the turret axis by the angle α to the tool change position and/or to swivel the second work spindle by rotating the rotatable turret about the turret axis by the angle α in the opposite direction to the machining position.

15. The machine tool according to claim 10, wherein the work spindle positioned at the machining position is configured by way of an accommodated tool to machine the workpiece clamped at the workpiece clamping device.

16. The machine tool according to claim 10, further comprising:
a tool magazine which is configured to have available a plurality of tools, and
a tool change apparatus which is configured to insert a tool to be inserted at the work spindle positioned at the tool change position, to remove a tool accommodated at the work spindle positioned at the tool change position and/or to exchange a tool accommodated at the work spindle positioned at the tool change position with a tool removed from the tool magazine.

17. The machine tool according to claim 16, wherein the work spindle positioned at the machining position is configured by way of an accommodated tool to machine the workpiece clamped at the workpiece clamping device while the tool change apparatus inserts or removes a tool at the work spindle positioned at the tool change position or exchanges it with a tool removed from the tool magazine.

18. The machine tool according to claim 16, further comprising a protection cover apparatus which can be opened and closed automatically and which, in the closed state, separates a machining area of the machine tool that includes the workpiece clamping device from a tool change area of the machine tool that includes the tool change apparatus.

19. The machine tool according to claim 18, wherein the protection cover apparatus opens when by rotating the turret one of the work spindles is swiveled from the tool change position or from a rest position and/or into the machining position and/or one of the other work spindles is swiveled from the machining position or from a rest position and/or into the tool change position and closes after rotating the turret.

20. The machine tool according to claim 1, wherein the work spindles arranged on the rotatable turret are attached to spindle axles aligned in parallel to the turret axis in fixed fashion.

21. The machine tool according to claim 1, wherein one or more of the work spindles arranged at the rotatable turret are held in such a way that they can be swiveled.

22. The machine tool according to claim 21, wherein the one or more work spindles that can be swiveled can be aligned in parallel to the turret axis and are configured to be swiveled at the work position in a vertical plane and/or in a horizontal plane in relation to the alignment of the turret axis.

23. A machine tool, comprising:
a machine frame;
a workpiece clamping device for clamping a workpiece;
an axis slide assembly which is arranged on the machine frame and which is configured to linearly move the workpiece clamped at the workpiece clamping device by way of three controllable linear axes; and
a spindle carrier assembly which is arranged on the machine frame and has at least two tool-carrying work spindles;
wherein the work spindles are arranged on a turret which can be rotated or swiveled about a turret axis at respectively equal distance from the turret axis and the spindle axes of the work spindles are aligned or can be aligned in parallel to one another and in parallel to the turret axis, and
wherein one or more of the work spindles arranged at the rotatable turret can be moved in one direction by way of a linear axis in parallel to the spindle axis and/or in parallel to the turret axis.

24. A machine tool, comprising:
a machine frame;
a workpiece clamping device for clamping a workpiece;
an axis slide assembly which is arranged at the machine frame and which is configured to linearly move the workpiece clamped at the workpiece clamping device by way of two or three controllable linear axes; and
a spindle carrier assembly which is arranged at the machine frame and has at least two tool-carrying work spindles;
wherein the work spindles are arranged at a turret which can be rotated or swiveled about a turret axis at respectively equal distance from the turret axis and can be moved in one direction by way of a linear axis in parallel to the spindle axis and/or in parallel to the turret axis, and the spindle axes of the work spindles are aligned or can be aligned in parallel to one another and in parallel to the turret axis.

* * * * *